United States Patent
Cooper et al.

(10) Patent No.: US 9,571,507 B2
(45) Date of Patent: Feb. 14, 2017

(54) PROVIDING A VIRTUAL SECURITY APPLIANCE ARCHITECTURE TO A VIRTUAL CLOUD INFRASTRUCTURE

(71) Applicant: McAfee, Inc., Santa Clara, CA (US)

(72) Inventors: Geoffrey Howard Cooper, Palo Alto, CA (US); Manuel Nedbal, Santa Clara, CA (US); Hemang Satish Nadkarni, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 520 days.

(21) Appl. No.: 13/656,730

(22) Filed: Oct. 21, 2012

(65) Prior Publication Data

US 2014/0115578 A1 Apr. 24, 2014

(51) Int. Cl.
| | |
|---|---|
| G06F 9/455 | (2006.01) |
| H04L 29/06 | (2006.01) |
| G06F 21/60 | (2013.01) |
| G06F 21/50 | (2013.01) |

(52) U.S. Cl.
CPC ......... *H04L 63/1416* (2013.01); *G06F 21/606* (2013.01); *H04L 63/205* (2013.01); *G06F 21/50* (2013.01); *G06F 2009/45587* (2013.01); *G06F 2009/45595* (2013.01); *H04L 63/105* (2013.01)

(58) Field of Classification Search
None
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,460,050 B1 | 10/2002 | Pace et al. |

(Continued)

FOREIGN PATENT DOCUMENTS

| | | |
|---|---|---|
| CN | 102739645 A | 10/2012 |
| WO | WO 2008/108868 A1 | 9/2008 |

(Continued)

OTHER PUBLICATIONS

A Fuzzy-Based Dynamic Provision Approach for Virtualized Network Intrusion Detection Systems Bo Li, Jianxin Li, Tianyu Wo, Xudong Wu, Junaid Arshad, and Wantao Liu Published: 2010.*

(Continued)

*Primary Examiner* — Emerson Puente
*Assistant Examiner* — Paul Mills
(74) *Attorney, Agent, or Firm* — Patent Capital Group

(57) ABSTRACT

A method in an embodiment includes detecting a change for a virtual machine in a virtual server of a virtual network infrastructure, determining whether a virtual security appliance is configured in the virtual server, and sending a request to create the virtual security appliance in the virtual server. The method further includes allowing the virtual machine to initiate when the virtual security appliance is created in the virtual machine. The virtual security appliance performs security inspections on network packets sent from the virtual machine. In more specific embodiments, the method further includes creating an intercept mechanism in the virtual server to intercept the network packets from the virtual machine. In further embodiments, one or more security policies identify one or more virtual security appliances to process the network packets from the virtual machine.

23 Claims, 19 Drawing Sheets

(56) References Cited

U.S. PATENT DOCUMENTS

| | | | |
|---|---|---|---|
| 7,506,155 B1 | | 3/2009 | Stewart et al. |
| 8,353,031 B1 | * | 1/2013 | Rajan et al. ................... 726/22 |
| 8,631,458 B1 | * | 1/2014 | Banerjee ............. G06F 9/45558 |
| | | | 718/1 |
| 2007/0266433 A1 | | 11/2007 | Moore |
| 2008/0046960 A1 | * | 2/2008 | Bade ..................... G06F 9/4856 |
| | | | 726/1 |
| 2008/0104608 A1 | * | 5/2008 | Hyser et al. .................. 718/105 |
| 2008/0134176 A1 | * | 6/2008 | Fitzgerald ........... G06F 9/45537 |
| | | | 718/1 |
| 2008/0163207 A1 | * | 7/2008 | Reumann et al. ................. 718/1 |
| 2009/0073895 A1 | | 3/2009 | Morgan et al. |
| 2009/0172799 A1 | * | 7/2009 | Morgan .............. G06F 11/2023 |
| | | | 726/11 |
| 2009/0254990 A1 | * | 10/2009 | McGee .......................... 726/22 |
| 2009/0292858 A1 | * | 11/2009 | Lambeth et al. ................. 711/6 |
| 2010/0131636 A1 | | 5/2010 | Suri et al. |
| 2010/0169507 A1 | | 7/2010 | Sahita et al. |
| 2010/0268812 A1 | * | 10/2010 | Mohrmann ............. G06F 21/53 |
| | | | 709/224 |
| 2011/0022812 A1 | | 1/2011 | van der Linden et al. |
| 2011/0099548 A1 | * | 4/2011 | Shen ................... G06F 9/45558 |
| | | | 718/1 |
| 2012/0240181 A1 | * | 9/2012 | McCorkendale et al. ........ 726/1 |
| 2013/0263208 A1 | * | 10/2013 | Challa ..................... G06F 21/44 |
| | | | 726/1 |
| 2013/0332983 A1 | * | 12/2013 | Koorevaar et al. ............... 726/1 |
| 2014/0026231 A1 | * | 1/2014 | Barak ................. G06F 9/45558 |
| | | | 726/29 |

FOREIGN PATENT DOCUMENTS

| | | |
|---|---|---|
| WO | WO 2012-003486 A1 | 1/2012 |
| WO | WO 2014/063129 A1 | 4/2014 |

OTHER PUBLICATIONS

EPIC: Platform-as-a-ServiceModel for Cloud Networking Theophilus Benson, Aditya Akella, Sambit Sahu, and Anees Shaikh Published: Feb. 2011.*

International Search Report and Written Opinion in International Application No. PCT/US2013/065806, mailed Mar. 7, 2014, 10 pages.

International Preliminary Report on Patentability in International Application No. PCT/US2013/065806, mailed on Apr. 21, 2015, 8 pages.

Supplementary European Search Report in EP 13 84 6316, mailed on Apr. 29, 2016, 6 pages.

Office Action in CN Application No. 201380050646.4, no English translation, mailed on Sep. 1, 2016, 18 pages.

* cited by examiner

PROVIDING A VIRTUAL SECURITY APPLIANCE ARCHITECTURE TO A VIRTUAL CLOUD INFRASTRUCTURE

TECHNICAL FIELD

This disclosure relates in general to virtualization and, more particularly, to providing a virtual security appliance architecture to a virtual cloud infrastructure.

BACKGROUND

The evolution of virtualization techniques has coincided, and to some extent has merged, with the movement toward cloud computing. In general, virtualization obscures hardware characteristics of a computing platform and instead presents an abstract platform that can host other platforms, including complete operating systems. One popular virtualization technique is to deploy a hypervisor (also known as a virtual machine manager) that can allow guest software (including complete operating systems) to run concurrently on an abstract host platform. The hypervisor can provide a simulated computing environment, often referred to as a "virtual machine," for its guest software. Thus, multiple disparate operating systems can run under a hypervisor on a single physical machine, for example.

Cloud computing is generally the use of computing resources that are delivered as a service over a network, such as the Internet. In cloud computing, various remote computers, servers, and data storage systems can provide services by storing data and hosting applications. End user computers can access applications in the cloud infrastructure via a web browser or other application that provides network access to a host. Typically, compute, storage, and network resources are offered in a cloud infrastructure, effectively shifting the workload from a local network to the cloud network.

Virtualization applied to a cloud infrastructure can provide numerous benefits. In particular, a virtualized cloud infrastructure can maximize the output of the physical machines in the infrastructure, can enable customers to buy only the resources it uses or wants, and can provide flexibility and speed in responding to changes in a customer's network resource requirements. Virtual machines, however, are likely to become more popular targets for malicious attacks, as the use of virtualized cloud infrastructures continues to grow. While cloud virtualization provides many advantages, it can also present unique security challenges, as the nature of the virtualized infrastructure is to enable quick deployment of new resources. Hence, many challenges remain for providing a secure virtualized cloud infrastructure.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in an example embodiment includes detecting a change for a virtual machine in a virtual server of a virtual network infrastructure, determining whether a virtual security appliance is configured in the virtual server, and sending a request to create the virtual security appliance in the virtual server. The method further includes allowing the virtual machine to initiate when the virtual security appliance is created in the virtual machine. The virtual security appliance performs security inspections on network packets sent from the virtual machine. In more specific embodiments, the method further includes creating an intercept mechanism in the virtual server to intercept the network packets from the virtual machine. In further embodiments, one or more security policies identify one or more virtual security appliances to process the network packets from the virtual machine.

A method in another example embodiment includes polling a virtual security appliance in a virtual server of a virtual network infrastructure to determine a utilization rate of the virtual security appliance, sending a request to a cloud manager to increase computing resources for the virtual security appliance if the utilization rate is above an upper threshold amount, and sending a request to the cloud manager to decrease computing resources for the virtual security appliance if the utilization rate is below a lower threshold amount. In the method, network packets associated with one or more virtual machines in the virtual server are routed to the virtual security appliance. In more specific embodiments, the network packets are intercepted prior to being routed to the virtual security appliance.

Example Embodiments

Figure 1:
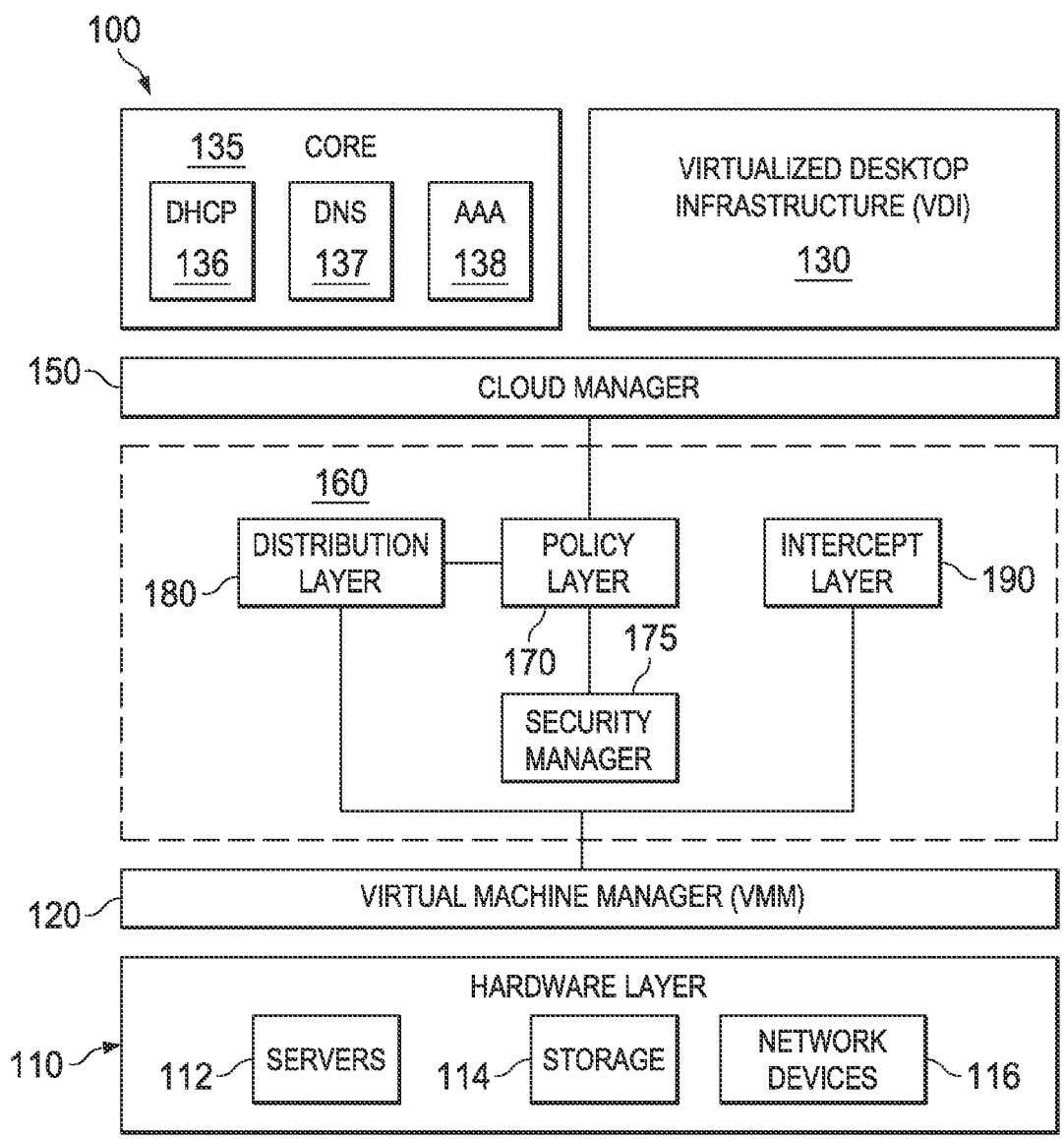
FIG. 1 is a block diagram of a system for providing a virtual security appliance architecture in a virtual cloud infrastructure in accordance with an embodiment of the present disclosure.

FIG. 1 is an example illustration of a communication system 100 for providing a virtual security appliance architecture in a virtual cloud infrastructure in accordance with an embodiment of the present disclosure. Communication system 100 may represent a virtual cloud infrastructure comprising a hardware layer 110, a virtualization layer (represented generally by virtual machine manager (VMM) 120), a set of core resources 135, a virtualized desktop infrastructure (VDI) 130, and a cloud manager 150. Hardware layer 110 can include servers 112, other network devices 116, and storage 114. Core resources 135 can include network protocols to enable and manage access to various networks including, for example, internal networks, wireless networks, the Internet, etc. In one example implementation, core resources 135 can include Dynamic Host Configuration Protocol (DHCP) networking protocol server 136, Domain Name Service (DNS) 137, and Authentication, Authorization, and Accounting (AAA) networking protocol server 138. A virtual security system 160 is provided to enable provisioning and managing of a virtual security appliance architecture in communication system 100. Virtual security system can include a policy layer 170, a security manager 175, a distribution layer 180, and an intercept layer 190.

Generally, communication system 100 may be implemented in any suitable type or topology of network (e.g., Intranet, Extranet, LAN, WAN, WLAN, MAN, VLAN, VPN, cellular network, etc.) or suitable combinations thereof, including wired and/or wireless communication. Elements of FIG. 1 may couple to one another through simple interfaces or through any other suitable connection (wired or wireless), which provides a viable pathway for network communications. Additionally, any one or more of these elements may be combined or removed from the architecture based on particular configuration needs.

Network traffic is a form of network communications and is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., TCP/IP). Additionally, messages, requests, responses, and queries are forms of network traffic, and therefore, may comprise packets, frames, signals, data, etc. In certain communication protocols, such as TCP/IP, a single message, request, response, or query may be broken down into multiple packets, which define a "packet stream." A packet stream may also be referred to herein as a "flow," which can include non-byte-stream exchanges such as voice over IP (VOIP) or domain name service messages. Moreover, a flow can also be identified by properties including, but not limited to, a 5-tuple (i.e., source IP address, destination IP address, source port, destination port, and IP protocol), a physical port of an appliance, a virtual port, a VXLAN, and/or a VLAN. As used herein, the term "data" refers to any type of binary, numeric, voice, video, textual, or script data, or any type of source or object code, or any other suitable information in any appropriate format that may be communicated from one point to another in electronic devices and/or networks.

For purposes of illustrating certain example techniques of communication system 100, it is important to understand the communications that may be traversing the virtual cloud infrastructure. The following foundational information may be viewed as a basis from which the present disclosure may be properly explained.

Networks with dedicated, local hardware resources are fast being replaced with cloud-based virtual infrastructures. Organizations such as businesses, schools, and governmental agencies are beginning to recognize the advantages of offloading information technology to a cloud-based virtual infrastructure.

One type of cloud virtualization includes allocating virtual networks for each network in a non-virtualized data center. Each physical machine may also be virtualized on the virtual network. Generally, the virtual infrastructure parallels the physical infrastructure in this implementation. There is some ability to provide security within this configuration, including simply maintaining the same security used prior to the virtualization.

Another virtualization solution is based on a flat, unstructured network in which servers and their internal networks are all connected in a single, flat, network, with no network elements, such as routers or firewalls, to give it a structure related to its purpose. A flattened network allows certain portions of a network to be allocated based on the needs of a particular entity. For example, Information Technology (IT) administrators can allocate a portion of a virtualized data center based on compute, storage, and network requirements. A management console may be provided to allow the IT administrator to request a desired number of networks, a desired amount of processing capabilities, and a desired amount of data storage, which can be created anywhere within the virtualized infrastructure. Thus, virtual machines may be created anywhere within the virtual infrastructure and this may be transparent to the entity (or user). Moreover, virtual machines, networks, and data storage may be moved within the infrastructure based on particular needs in managing the infrastructure. Such changes may also be transparent to the entity. The entity may have access to its allocated compute, network, and data storage resources, without actually having knowledge of the physical location of its resources.

In a structured network, network administrators typically estimate or measure network usage and decide where and what kind of security equipment to allocate. This often leads to a relatively static and expensive deployment of security appliances, because the appliances need to be over-allocated to meet burstiness of network traffic or growth over time. The ability to transparently add and move resources within a flattened virtual cloud network can provide significant flexibility in deploying desired network resources. However, the common practice of locating security devices at strategic points in the topology of a network is at conflict with the deployment of flat, unstructured networks that provide superior flexibility to the hypervisor. What is needed is a Security solution that uses system resources depending on the load and that provides flexibility and scalability as the security needs change.

In accordance with an example embodiment, communication system 100 can resolve the aforementioned issues associated with providing security in a virtual cloud infrastructure. More specifically, virtual security system 160 of communication system 100 includes a distribution layer at a front-end, network stream level, that routes packets of network traffic to back-end security processes. The distribution layer can perform policy functions to determine which back-end security processes are required for particular data. The distribution layer may then perform routing activities to send the packets to the correct security processes in the correct order. The back-end security processes can perform compute-intensive security functions on network traffic. The distribution layer can receive packets, which may be intercepted from a source virtual machine, which can be accomplished using several different interception techniques. The intercept layer of virtual security system 160 can be configured to intercept packets to and from a virtual switch, from a configuration using a network interface card's technology (e.g., SR-IOV) and a hardware switching capability, or from integrating into an OpenFlow switch framework. The vSWITCH 422-2 may also provide an API-based intercept mechanism.

Using a distribution manager, an elastic (or flexible) system for implementing security controls in the form of virtual security appliances (VSAs) may be created in a VMM. Traffic may be routed manually to the distribution manager and thus to the VSAs. In another embodiment, an intercept mechanism permits traffic to be intercepted by the distribution manager and routed to the VSAs without manual routing. The system can be configured to monitor the VSAs and to request changes to increase or decrease their use of the VMM resources (CPU, memory, storage) and/or to increase or decrease the number of VSAs in the VMM. The requested changes may be based on the incoming load, configured load limits, and/or security policies of existing virtual machines in the VMM. A policy layer can improve the responsiveness of an elastic (or flexible) mechanism for configuring desired security controls as the virtual infrastructure changes. The policy layer can detect a change to a virtual machine in the virtual infrastructure, or a new or updated security policy for an existing virtual machine, and can communicate with the distribution layer to setup and configure any interception mechanisms and additional back-end security processes that may be required by policy. Thus, the back-end security processes, in the form of virtual security appliances, may be allocated and deallocated as needed. Moreover, increments in processing power may be small, so that virtual security system 160 does not need to over-allocate security processing resources, such as VSAs. Accordingly, this elastic (or flexible) security system can grow and shrink as is uses more and less, respectively, with the presented load.

Turning to the infrastructure of FIG. 1, FIG. 1 illustrates communication system 100 in which a layered view of virtual security system 160 is provided. Communication system 100 represents a virtual cloud infrastructure that provides allocated resources and networks to one or more respective entities. The allocated resources and networks may be accessed remotely by users through suitable public or private networks such as the Internet, another wide area network (WAN), a virtual private network (VPN), etc.

Communication system 100 is configured with a virtual cloud infrastructure in which a layer of VMM 120 is represented on physical network devices 116 in a uniform single layer, such that the structure of the network has been flattened. VMM 120 represents the VMMs or hypervisors that run on top of hardware layer 110 and manage and monitor virtual machines in communication system 100. The flattened VMM 120 allows virtual machines to be easily created in communication system 100, and easily moved between different underlying hardware components in hardware layer 110.

Virtual security system 160 allows users to allocate security in the form of an elastic virtual security appliances (VSAs) architecture. VSAs can be allocated and deallocated, as needed, to apply policy-defined security controls to network traffic of virtual machines. Policy layer 170 represents one or more policy managers that are provided in communication system 100 to store user-defined, system-defined, or default security policies for virtual machines in communication system 100. Virtual machines may be created or moved via cloud manager 150. Cloud manager 150 can be configured to allow users to request specific compute, hardware, and network resources desired in the virtual cloud infrastructure of communication system 100. The one or more policy managers of policy layer 170 may be configured to communicate with cloud manager 150. Security manager 175 may enable users to provide policies for virtual machines as they are added or moved via cloud manager 150, for existing virtual machines when security needs change, or for yet unknown virtual machines who may need default policies applied. In some instances, security manager 175 and cloud manager 150 may be integrated. These managers may be provided as system-wide management services for one or more networks configured in communication system 100. These managers may also be implemented on dedicated hardware (e.g., dedicated servers and storage) and may run with or without virtualization. In an embodiment, the one or more networks may be associated with a particular entity (e.g., an enterprise, corporation, school, governmental agency, or other organization).

Policy layer 170 may also interact with distribution layer 180. Distribution layer 180 can include a distribution manager on each virtualized server to setup and configure intercept mechanisms of intercept layer 190. In intercept layer 190, network traffic from a virtual machine is intercepted and provided to distribution layer 180. Distribution layer 180 routes network traffic to appropriate security controls, which can be in the form of virtual security appliances. Distribution layer 180 may also be configured to interact with cloud manager 150 to allocate and configure virtual security appliances as needed. For example, virtual security appliances could be created when virtual machines are added or moved, when security policies for a virtual machine are changed, and when a policy is added or updated based on other events (e.g., when new type of virtual machine joins the network).

Communication system 100 can also include core resources 135 providing various networking protocols to enable network communication. In an embodiment, core resources 135 may include AAA server 138, to provide authentication, authorization, and accounting management for computers to connect and use a network service. One example networking protocol for AAA server is Remote Authentication Dial In User Service (RADIUS) networking protocol. Core resources 135 may also include DHCP server 136 to configure network elements, including user endpoints, to enable communication on an Internet Protocol (IP)

network. DNS server 137 can provides a directory service to provide internal system addresses that correspond to human-readable identifiers (e.g., uniform resource locator). The various core resources may be provided in virtual machines and/or may be provided on dedicated hardware in communication system 100.

Virtualized desktop infrastructure (VDI) 130 can enable desktop virtualization on remote servers, for example in the virtual cloud infrastructure of communication system 100. In one example, a separate virtual machine may be created for each physical desktop. Other virtual machines may also be allocated and created in the virtual cloud infrastructure for a given entity. Services typically provided via a network may be virtualized in a virtual machine and managed by VMM 120. Examples of services that could be implemented in a virtual machine of communication system 100 include messaging services and business specific services (e.g., engineering applications, accounting applications, manufacturing applications, legal applications, etc.).

In one example implementation, the elements of hardware layer 110 are network elements, which are meant to encompass network appliances, firewalls, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, elements of hardware layer 110 can include memory elements for storing information to be used in the operations outlined herein. Elements of hardware layer 110 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein (e.g., storage 114) should be construed as being encompassed within the broad term "memory element." The information being used, tracked, sent, or received by communication system 100, and in virtual security system 160 could be provided in any database, register, queue, table, cache, control list, or other storage structure, all of which can be referenced at any suitable timeframe. Any such storage options may be included within the broad term "memory element" as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In example implementations, communication system 100 may include software modules (e.g., in distribution layer 180, policy layer 170, intercept layer 190, etc.), including virtual machines, to achieve, or to foster, operations as outlined herein. In other embodiments, such operations may be carried out by hardware, firmware, implemented externally to these elements, or included in some other network device or some other virtual server, virtual machine, virtual switch, or virtual network interface card, to achieve the intended functionality. Alternatively, these elements may include software (or reciprocating software) that can coordinate in order to achieve the operations, as outlined herein. In still other embodiments, one or all of these devices may include any suitable algorithms, hardware, firmware, software, components, modules, managers, virtual machines, interfaces, or objects that facilitate the operations thereof.

Additionally, hardware layer 110 may include processors (e.g., in servers 112, in network devices 116) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term "processor."

Figure 2:
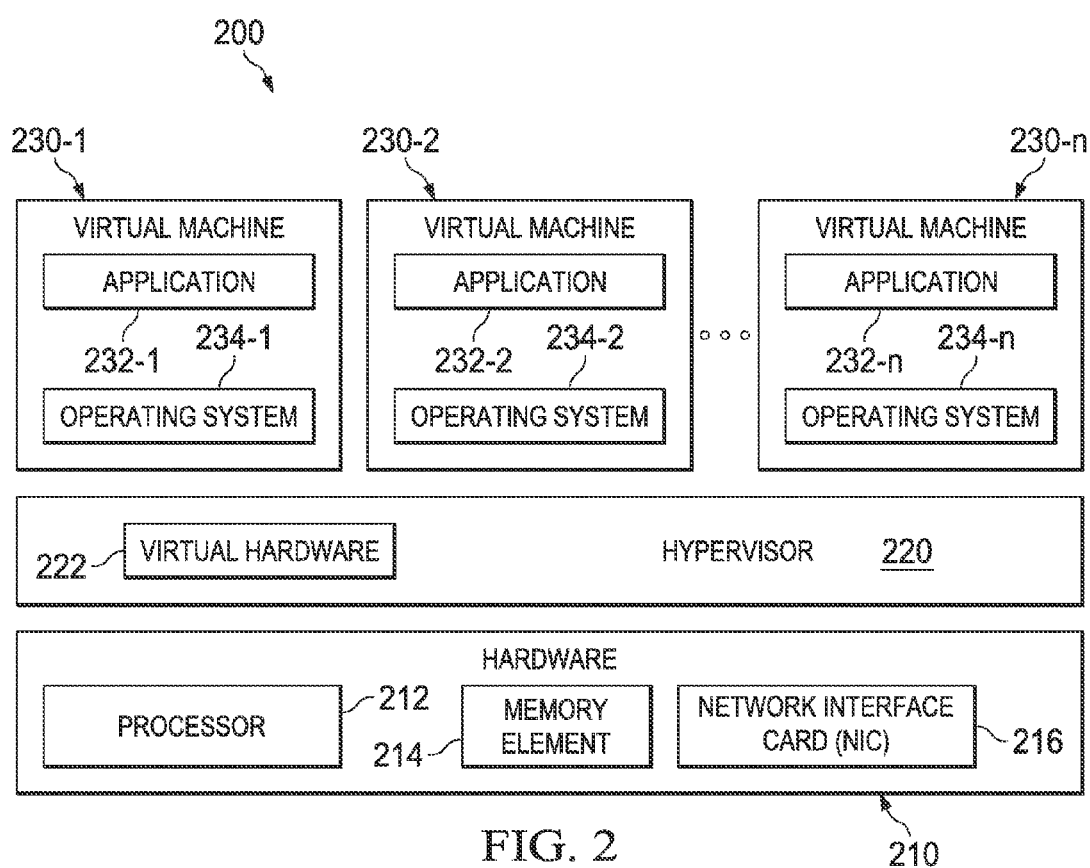
FIG. 2 is a block diagram of a virtualized computing system in accordance with an embodiment.

In FIG. 2, a simplified block diagram illustrates the layers of a virtualized server 200 (referred to herein as a "virtual server") that may be implemented in accordance with the present disclosure. Virtual server 200 may be configured with, for example, VMware ESX or ESXi, SAP or other web services, or with command line interfaces, remote scripts, etc. Virtual server 200 may include virtual machines 230-1 through 230-n. Virtual machines 230-1 through 230-n can have respective operating systems 234-1 through 234-n, which run respective applications 232-1 through 232-n. References herein to similar components having the same reference number may be individually referred to by a numerical suffix with the reference number, or may be collectively referred to by omitting the numerical suffix.

Virtual server 200 may also include a hypervisor 220, which can run on hardware 210 and which provides the capability of running multiple instances of operating systems 234 and associated applications 232. Hypervisor 220 can also be referred to as a virtual machine monitor (VMM), which can be associated with a single machine such as virtual server 200. Hypervisor 220 and hardware 210 can be can be part of VMM 120 and hardware layer 110, respectively, of communication system 100 in FIG. 1. The operating systems and applications can be run concurrently by dynamically allocating the hardware resources to operating systems 234 and applications 232 as needed. In this arrangement, applications 232 are logically run on top of respective operating systems 234, which are associated with respective virtual machines 230, and are provided with virtual hardware 222 (e.g., switches, processors, CD/DVD drives, floppy drives, memory, SCSI devices, network interface cards, parallel ports, serial ports, etc.). A virtual switch is a software program that allows communication between, for example, virtual machines and other virtual components, and may operate in a manner similar to physical L2 or L3 switches.

Physical hardware 210 beneath hypervisor 220 may include a processor 212, a memory element 214, and a network interface card (NIC) 216. Hardware 210 may also include additional components such as, for example, a layer 2 (L2) switch. The entire configuration may be provided in a server (or some other suitable network element). This implementation is only representing one possible example to which the present disclosure can apply. Any number of additional hypervisors or virtual elements could similarly benefit from the broad teachings discussed herein.

Typically, in server virtualization an authorized user is provided with an interface to manage a complete setup of virtual machines and the associated applications, operating systems, and virtual hardware. This management includes the hypervisor configuration and virtual machine configuration, including creation, deletion, modification, shutdown, startup, etc.

In cloud virtualization, an authorized user may be provided with a console and an interface to manage a complete setup of a virtual infrastructure in the "cloud." The cloud could be a remote datacenter, public or private. A cloud could be a remote or local private network. Generally, the authorized user may be able to request specific compute, storage, and network resources from the console. These resources can then be allocated in the cloud, without the user having knowledge of the exact physical hardware components that are being used.

Not shown in FIG. 2 is additional hardware that may be suitably coupled to processor 212, memory element 214, and/or network interface card 216. Additional hardware may include, but is not limited to, memory management units (MMU), additional symmetric multiprocessing (SMP) elements, physical memory, Ethernet, peripheral component interconnect (PCI) bus and corresponding bridges, small computer system interface (SCSI)/integrated drive electronics (IDE) elements.

For ease of illustration, not all components associated with a virtual server as described with reference to virtual server 200 of FIG. 2, are shown in subsequent FIGURES. However, it is to be understood that any of the components, modules, hardware, firmware, or software described with reference to virtual servers in FIGS. 1-2 may also be included, albeit not necessarily shown, in other FIGURES herein.

Figure 3:
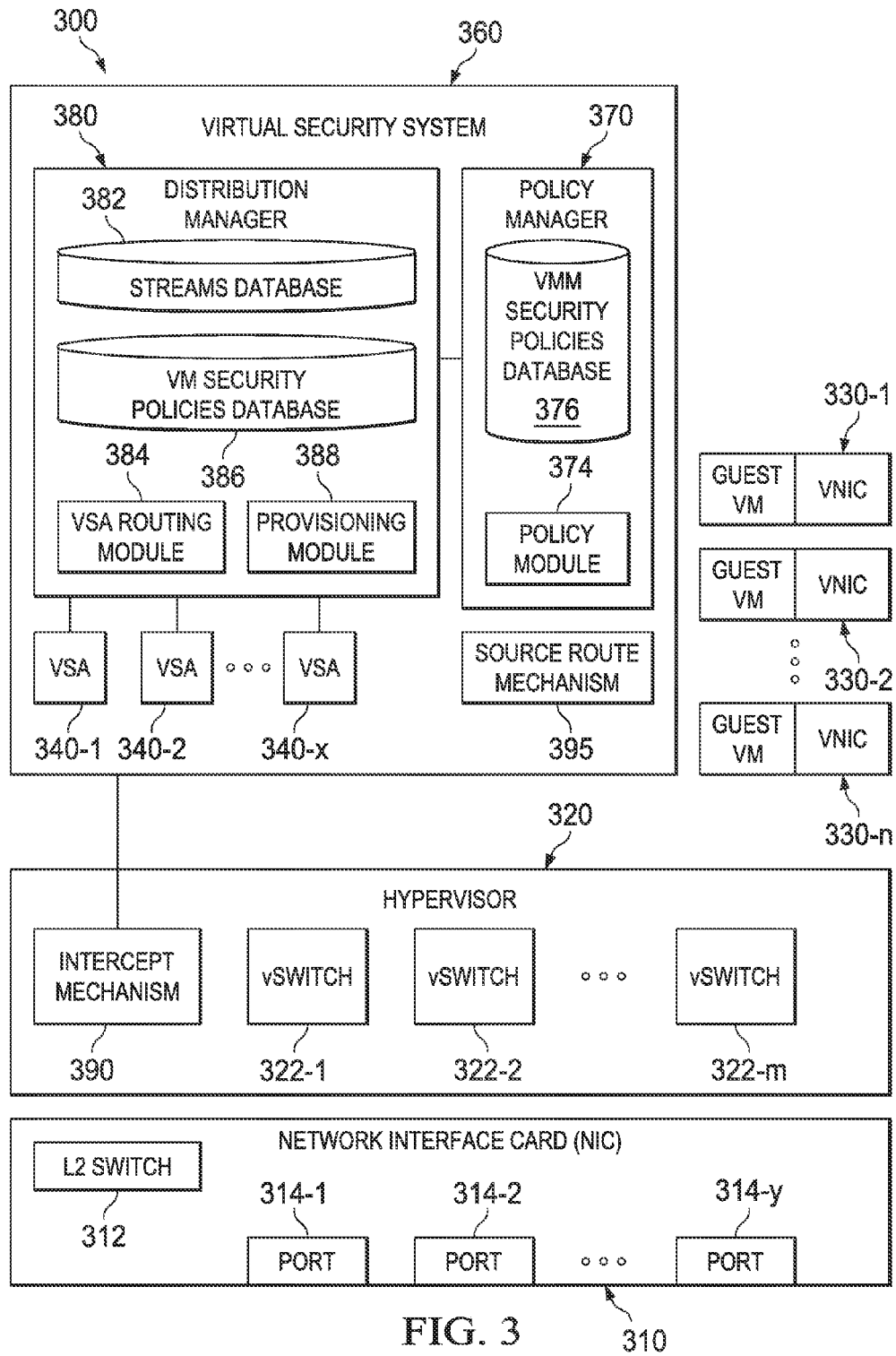
FIG. 3 is a block diagram showing a example virtualized computing system with additional details of the system in accordance with an embodiment.

FIG. 3 is a simplified block diagram illustrating one possible set of details associated with an embodiment of a virtual server 300 in communication system 100 of FIG. 1. Virtual server 300 can include guest virtual machines (VMs) 330-1 through 330-n, a hypervisor 320, a network interface card 310, and a virtual security system 360. NIC 310 can be part of hardware of virtual server 300 and include ports 314-1 through 314-y and a layer 2 (L2) switch 312. Virtualized hardware is managed by hypervisor 320, and can include one or more virtual switches (vSwitches) 322-1 through 322-m. These vSwitches may be virtualized switches through which virtual machines on virtual server 30 communicate. Physical L2 switch 312 may also be used for communication between virtual machines of virtual server 300 in certain embodiments where the NIC includes special functionality to enable the communication via L2 switch 312, as will be further described herein. Although an L2 switch is shown and/or described with reference to various embodiments herein, it is to be understood that other switches may also be compatible with such embodiments. For example, a suitable alternative switch includes, but is not necessarily limited to, an L2 switch with layer 3 (L3) capabilities.

Virtual security system 360 illustrates example components of virtual security system 160, implemented in virtual server 300. In the example implementation in virtual server 300, virtual security system 360 can include a flexible collection of virtual security appliances (VSAs) 340-1 through 340-x, a distribution manager 380, a policy manager 370, a source route mechanism 395, and an intercept mechanism 390.

In an embodiment, guest VMs, 330, VSAs 340, distribution manager 380, and policy manager 370 are all configured as virtual machines of virtual server 300, and are managed by hypervisor 320. Although policy manager 370 is generally referred to herein as a virtual machine, in any of those embodiments it could alternatively be hosted directly on a physical server. For example, policy manager 370 may be included with system-wide management services at least some portions of which are not configured as virtual machines.

Guest VMs represent at least some untrusted VMs. Therefore, policies in VM security policies 386 may require security inspections by one or more VSAs 340, of network traffic from guest VMs 330. Each guest VM may have its own unique policy with particular requirements regarding which VSAs are to receive network traffic from the guest VM and the order in which the VSAs 340 should receive the network traffic. Guest VMs 330 can be compatible with standard platform machines and may not have any special drivers or other software to participate in security mechanisms. Thus, virtual security system 360 can be applied to pre-existing installations or standard enterprise platforms.

VSAs 340 represent trusted virtual machines that implement any suitable type of security inspection. "Security inspection" as used herein is intended to include any type of network security mechanism including, but not limited to, intrusion prevention systems (IPS), intrusion detection systems (IDS), firewalls (FW), data loss prevention (DLP), antivirus scanning, deep packet inspection, whitelist evaluations, and blacklist evaluations. VSAs 340 may have particular knowledge of intercept mechanism 390 or source route mechanism 395. Moreover, VSAs 340 generally run in "bump in the wire" mode. Thus, firewalls in explicit routing mode can operate outside of virtual security system 360.

Guest VMs 330, other virtual machines (e.g., distribution manager 380, policy manager 370), and VSAs 340 may communicate with each other via one or more of vSwitches 322. In some embodiments, vSwitches 322 may be combined into a single domain (i.e., a single switch), which is used for VSAs 340 and potentially other VMs to communicate with each other and for guest VMs 330 to communicate with each other. In some embodiments, special functionality may be provided in NIC 310 to enable guest VMs, other VMs, and/or VSAs communicate via L2 switch 312. An example of this special functionality is the Single Root Input/Output Virtualization (SR-IOV) mechanism. SR-IOV is used to enable direct memory access (DMA), and will be further described herein.

Distribution manager 380 can maintain a streams database 382 to track connections between guest VMs 330 and other virtual machines, such as VSAs 340. A VM security policies database 386 can include one or more lists of VSAs 340 through which the network traffic from each guest VM 330 is to be routed. Lists may be similar to a router or layer 3 (L3) switch and may include, for example, a media access control (MAC) address for each VSA 340. The list could be a single list applicable to all guest VMs 330, individualized lists for each guest VM 330, or different lists for each set of guest VMs 330 with the same security policy requirements.

A source route mechanism 395 is also part of virtual security system 360 and may be provided, at least in part, in distribution manager 380. Source route mechanism 395 may be configured to enable distribution manager 380 to route a packet through one or more VSAs before the packet is returned to distribution manager 380. Several variations of source route mechanisms 384 may be implemented. The different routing mechanisms may lead to optimized network traffic paths that avoid physical network data at all if flows pass between vSwitches on the same hosts (e.g., servers). The variations of source route mechanisms will be further described herein.

An intercept mechanism 390 is also part of virtual security system 360. In an embodiment, intercept mechanism 390 may be provided in a vSwitch 322 to intercept each packet received from guest VMs 330 and redirect the intercepted packets to distribution manager 380. Several intercept mechanisms 390 may be implemented in virtual security system 360 and will be further described herein.

Policy manager 370 includes a policy module 374 to update security policies for guest VMs 330 in distribution manager 380. Policy manager 370 may also include VMM security policies database 376. VMM security policies database 376 may have security policies for guest VMs 330 of virtual server 300, in addition to other guest VMs of other virtual servers in communication system 100. In an embodiment, policy module 374 can use VMM security policies database 376 to update VM security policies database 386 with security policies for guest VMs 330.

Additionally, or alternatively, policy module 374 can use VMM security policies database 376 to update streams database 382. In this scenario, distribution manager may be configured to build up streams database 382 using a common algorithm for a layer 3 (L3) switch. Distribution manager 380 can be configured to query policy manager 370 for every new packet stream. In response to a query, policy module 374 can add to each packet stream database entry the identities (e.g., MAC addresses) of VSAs 340 that should process the particular packet stream associated with that entry.

Policy manager 370 may also be configured to facilitate the allocation of new VSAs as needed, and potentially, the configuration of intercept mechanism 390 also. If an appropriate VSA (as required by policy) is not available to process a packet stream, then policy module 374 can coordinate with other modules, managers, and virtual machines (e.g., distribution manager 380, cloud manager 150, security manager 175, etc.) to cause a new VSA to be setup, configured, and initiated. This scenario may occur, for example, the first time a particular VSA is needed (e.g., a first stream to need a DLP appliance). In another scenario, a given VSA may need to consume more computing resources (e.g., RAM, processor resources, etc.) to process a new packet stream.

Policy manager 370 (or distribution manager 380) can also facilitate managing the computing resources needed by the VSAs. In particular, policy manager 370 (or distribution manager 380) may be configured to estimate or query the capacity of all the existing VSAs. If policy manager 370 (or distribution manager 380) determines that more capacity is needed, then a new packet stream might trigger a new VSA, or might cause one of the existing VSAs to be enabled to use more central processing units (CPUs).

Policy manager 370 (or distribution manager 380) can also be configured to detect that a given duplicate VSA in a virtual server is under-utilized, to stop sending packet streams to it until it is idle, and then to delete its virtual machine. Alternatively, if a duplicate VSA is under-utilized, then its packet streams may be rerouted to the other similar VSA, if the other VSA can accommodate the additional network traffic load. In this way, the virtualization infrastructure is used to create an elastic security mechanism that grows and shrinks according to demand.

A system administrator can allow virtual security system 360 unrestricted freedom in allocating security on demand, or may apply a policy to affect the use of system resource. For example, the system administrator may limit security resources to no more than 10% of system resources. If the VSAs allocated in that 10% cannot handle the network traffic, the VSAs can slow down the network traffic, the system administrator can change their policies to allow them to process the traffic more selectively, or the system administrator may decide to allocate a higher percentage of system resources to VSAs.

Figure 4:
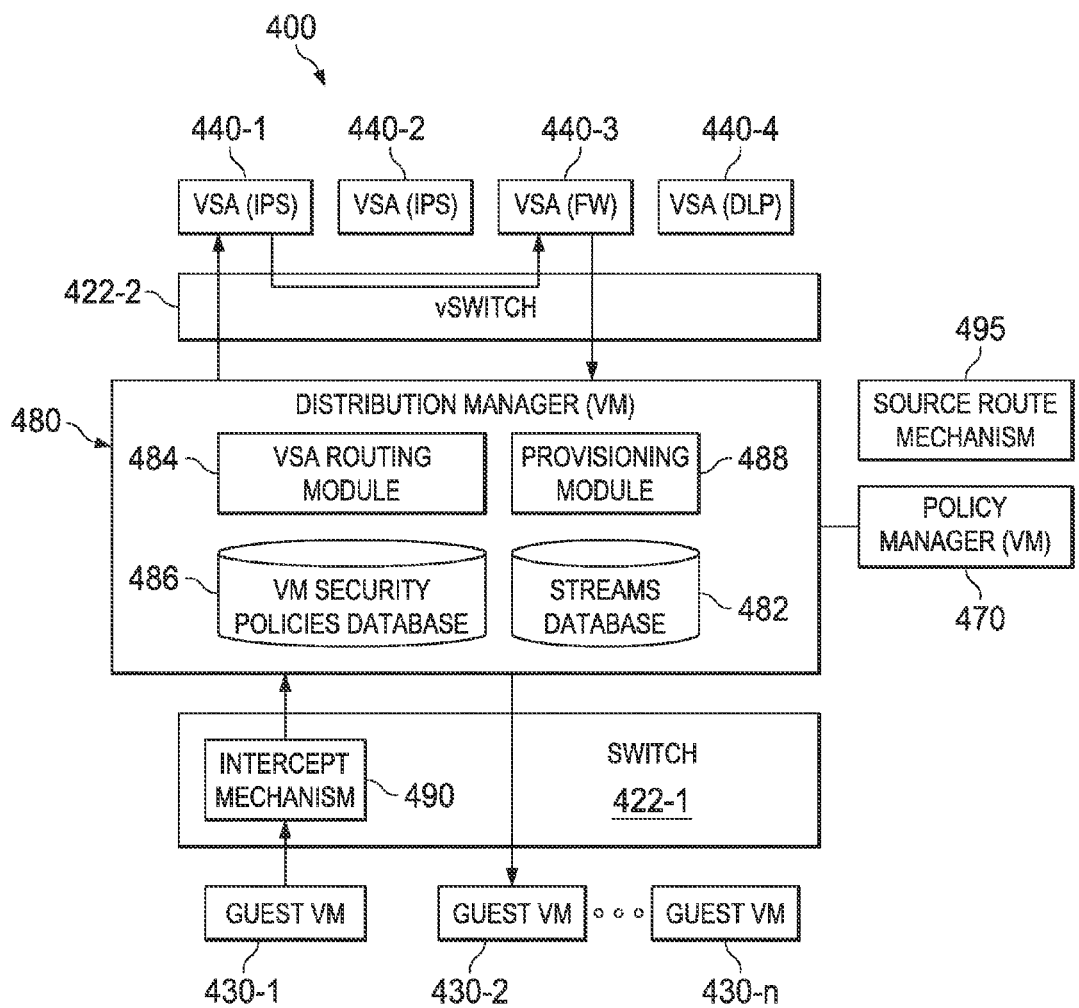
FIG. 4 is a block diagram illustrating a high level implementation scenario of the system in a virtualized computing system in accordance with an embodiment.

FIG. 4 is a simplified block diagram of certain components of a virtual server 400 with a virtual security system, illustrating an example scenario of a flow of a packet stream between two guest VMs. Virtual server 400 and its components may be configured in the same or similar manner as described with reference to virtual server 300 in FIG. 3. Virtual server 400 includes several virtual machines, including guest VMs 430-1 through 430-$n$, a distribution manager 480, a policy manager 470, and four VSAs 440-1 through 440-4.

Guest VMs 430 are connected to each other via a switch 422-1. Switch 422-1 may be a virtual switch in some embodiments. In other embodiments, switch 422-1 may be a physical switch located, for example, in a network interface card on virtual server 400 or external to virtual server 400. VSAs 440 are shown connected to each other via vSwitch 422-2. Generally, switches 422-1 and 422-2 are shown separately for purposes of clarity. Thus, switches 422-1 and 422-2 can typically be combined into a single domain that accommodates particular intercept mechanism techniques and source routing techniques. In some embodiments, however, vSwitch 422-2 and switch 422-1 may be different switches.

In FIG. 4, intercept mechanism 490 and source route mechanism 484 are generalized and represent several different configurations, which will be further described herein. In the example scenario of FIG. 4, a packet is sent from VM 430-1 to VM 430-2. The packet has a source address of VM1.MAC and a destination address of VM2.MAC. Intercept mechanism 490 causes the packet to be intercepted and/or redirected to distribution manager 480, instead of flowing to VM2.MAC.

If the packet is the first packet in a packet stream then distribution manager 480 builds up streams database 482. In one embodiment, VM policies database 486 contains security policies for guest VM 430-1. For example, VM policies database 486 may contain the identities of VSAs 440 that should process packet streams of guest VM 430-1. In another embodiment, distribution manager 480 queries policy manager 470 for the security policy of guest VM 430-1. Policy manager 470 provides the identities of each VSA 440 that should process the packet, for example by direct query or in a pre-provisioned policy that identifies the VSAs that match flows with certain parameters. Once the identities of the appropriate VSAs 440 are obtained, their identities can be added to each stream database entry associated with the packet stream. In this example scenario, the identities of VSA 440-1 and VSA 440-3 can be added to stream database 482.

If the packet received by distribution manager 480 is not the first packet of a packet stream, then distribution manager 480 performs an L3 inspection of the packet and looks up the stream in stream database 482. From data in the stream entry, distribution manager 480 creates a source route through the required security devices. In this scenario, VSA 440-1 and VSA 440-3 are selected. When the source route is created, database manager 480 can transmit the packet via switch 422-2 to VSA 440-1. VSA 440-1 is an IPS device, which can perform security scanning on the packet contents. If the packet passes the security scanning, VSA 440-1 may forward the packet to VSA 440-3 using the same source route mechanism 495. VSA 440-3 is a firewall that applies firewall policy to the packet. After the firewall policies are applied to the packet, VSA 440-3 may return the packet to distribution manager 480, using the final step of source route mechanism 495. Then, distribution manager 480 sends the packet to destination guest VM 430-2.

Either of the VSAs, VSA 440-1 or VSA 440-3, may block or change the packet en route. For example, if the packet does not pass security scanning of VSA 440-1 or if the packet does not comply with firewall policies of VSA 440-3, then either of these VSAs may block or change the packet.

A source route mechanism (e.g., 395, 495) may be used by a distribution manager to route packets within a packet stream to multiple virtual security appliances, in a particular order. Source route mechanism is invoked after network traffic between guest virtual machines is intercepted by an intercept mechanism. Generally, the distribution manager takes some data from its tables (e.g., streams database 482, 382), each time a packet is received, and modifies the packet so that each VSA can route the packet correctly to the next VSA or back to the distribution manager.

A source route mechanism may be configured in various ways to achieve the desired routing of packets from a guest VM to VSAs, as required by security policies for the guest VM. In one implementation, the source route mechanism is implemented the source route is defined in Requests for Comment (RFC) 791, Internet Protocol Darpa Internet Program Protocol Specification, September 1981. This mechanism can be used if distribution manager 480 and each of the VSAs 440 implements router functions. For example, if the virtual machines (e.g., guest VMs 430 and VSAs 440) are implemented with operating systems that have inherent routing functionalities, then the operating system provides this functionality. This technique enables a standard operating system implementation to do the source route.

Figure 5:
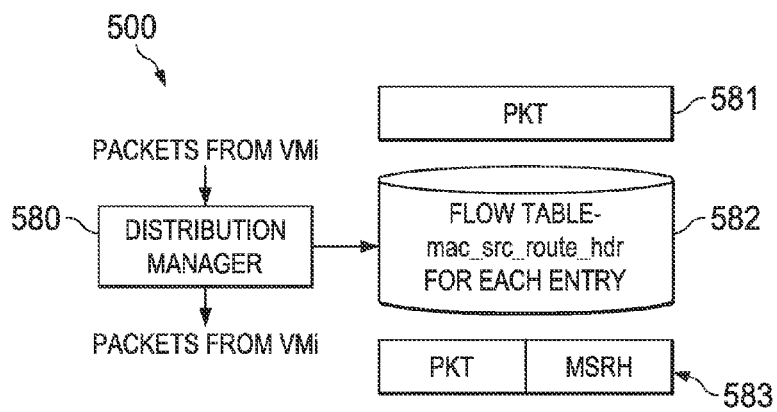
FIG. 5 is a block diagram illustrating a source routing technique using media access control (MAC) addresses in accordance with an embodiment of the system.

FIG. 5 is a block diagram of another source route mechanism using MAC header encapsulation, with or without a private virtual local area network (private VLAN). When IP Source Route is not an option, a cooperative MAC-level source route is possible. In this mechanism, a header is prefixed to each incoming packet 581 in a distribution manager 580 with the following structure:

```
typedef unsigned char mac_addr[6];
typedef struct {
    mac_addr dst;  // Ethernet header, destination
    mac_addr src;  // Ethernet header, source
    U16 etherType;  // Ethernet header, type
    U8 num_src_route;  // number of elements in the source route array
    mac_addr src_route[this.num_src_type];  // the source route
} mac_src_route_header;
```

Assume the above types are byte-wise packed. In the above, the first part of the header looks like an Ethernet II MAC header. Although this configuration is described with reference to MAC headers, suitable changes may be made to accommodate other types of headers, such as networks using IEEE 802.3 headers. An original packet starts after the mac_src_route_header. The offset for this can be computed as num_src_type*6+14, for each VSA to recover the original packet. During processing, the mac_src_route_header needs to be preserved. In one example, a flow table 582 may be constructed at driver level to use the same header for each packet in a packet stream. On output, the src_route_next header is incremented, and the next mac address in the src_route array is copied over the dst field.

Distribution manager creates the mac_source_route_header for each packet stream when the packet stream begins. The src_route array has the MAC address of each VSA needed to process this packet stream. These MAC addresses are part of the configuration of distribution manager 580. Alternatively, distribution manager 580 can derive the MAC addresses using address resolution protocol (ARP), bonjour or hypervisor calls. Src_route_next is set to zero, and the MAC address of distribution manager 580 itself is put as the last destination.

FIG. 5 illustrates example operations in a source routing mechanism using MAC header encapsulation. When a packet is received from a VMi (i.e., a guest VM) at 581, distribution manager 580 looks up the packet stream in flow table 582. Distribution manager 580 then adds the mac_source_route_header to the packet. At 583, distribution manager 580 retransmits the packet with the mac_source_route_header from flow table 582. Later, distribution manager 580 may receive the packet back from the last VSA to process it, assuming none of the VSAs blocked the packet. Distribution manager 580 removes the header and forwards the packet to the original destination VM.

Figure 6:
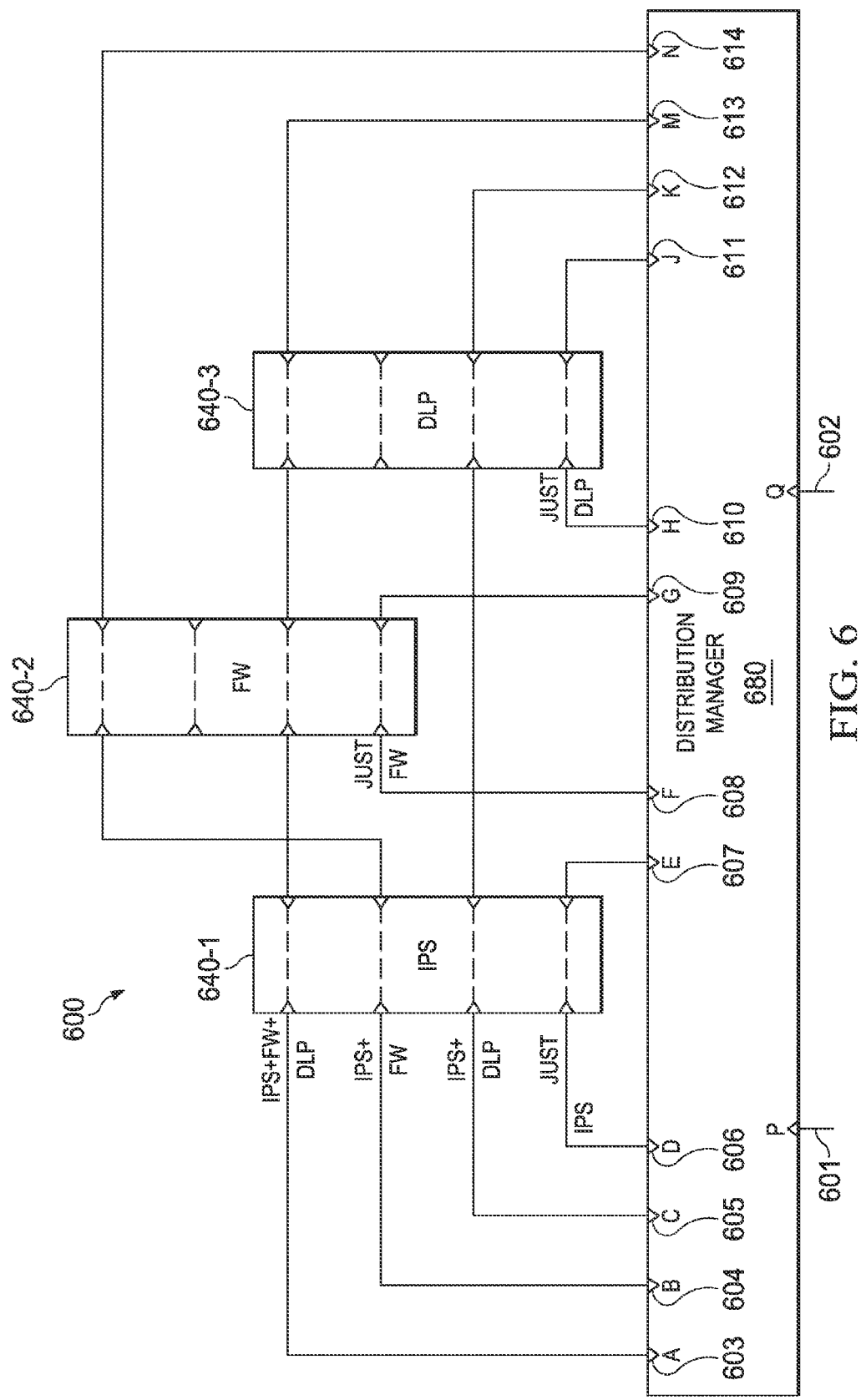
FIG. 6 is a block diagram illustrating a source routing technique using hardwired ports in an embodiment of the system.

FIG. 6 is a block diagram of representing example components of a virtual server 600 implementing another source route mechanism using hardwired virtual ports. Virtual server 600 and its components may be configured in the same or similar manner as described with reference to virtual server 300 in FIG. 3. Virtual server 600 includes a distribution manager 680 and three example virtual security appliances (VSAs), IPS 640-1, FW 640-2, and DLP 640-3. This source route mechanism is particularly suited to a configuration in which a small number (e.g., 2, 3) of different kinds of VSAs are used.

A source route mechanism using hardwired virtual ports can be implemented with virtual interfaces and virtual switches. Distribution manager 680 receives network traffic that is intercepted using an intercept mechanism (as will be further described herein). The network traffic may originate from a source guest virtual machine in virtual server 600 and have a destination address of a destination guest virtual machine in virtual server 600 or some other destination address external to virtual server 600. The network traffic may alternatively originate from a source external to virtual server 600 and have a destination address of a guest virtual machine in virtual server 600.

Once network traffic has been received by distribution manager 680, each packet stream is allocated to a set of VSAs, which are 'wired' so that the traffic goes from an output port of one VSA into an input port of another VSA. A final port is sent to distribution manager 680. If all VSAs 640 are implemented as "bump in the wire," the traffic flows through an effective source route. In this scheme, the VSA may need extra resources to implement many virtual interfaces, or an additional VSA may be needed to implement all the options. In another implementation, an additional virtual local area network (VLAN) tag may be used for each of the routes.

Since the number of different paths increases exponentially with the number of different security devices, this approach is better suited to a smaller number of VSAs. However, in some network environments, only a small number of security devices are desired and they are generally arranged in a defined order. Thus, the hardwired virtual port option for a source route mechanism may be particularly advantageous in these types of configurations.

With reference to the example scenario of FIG. 6, hardwired virtual ports perform source routing. Distribution manager 680 and each of the VSAs 640 (IPS, FW, and DLP) have many virtual interfaces. These are "wired" together in the diagram using lines, which represent one or more virtual switches between them. In an embodiment, a driver in each output interface may be statically configured with the MAC address of the next input interface or may use promiscuous mode in receiving interfaces to simulate a direct connection between two ports.

Packets can arrive from the intercept mechanism on port p 601 of distribution manager 680 and may be sent back on port q 602. To send to IPS 640-1 only, distribution manager 680 sends a packet on port d 606 and receives the output on port e 607. To send to FW 640-2 only, distribution manager 680 sends a packet on port f 608 and receives the output on port g 609. To send to DLP 640-3 only, distribution manager 680 sends a packet on port h 610 and receives the output on port j 611.

To send to IPS 640-1 and DLP 640-3 in that order, distribution manager 680 sends a packet on port c 605 and receives the output on port k 612. To send to IPS 640-1 and FW 640-2 in that order, distribution manager 680 sends a packet on port b 604 and receives the output on port n 614. Additional ports on distribution manager 680 could allow an additional hardwired virtual port route to be configured between FW 640-2 and DLP 640-3. Finally, to send to all of the available VSAs, IPS 640-1, FW 640-2, and DLP 640-3, in that order, distribution manager 680 sends a packet on port a 604 and receives the output on port m 613.

Figure 7:
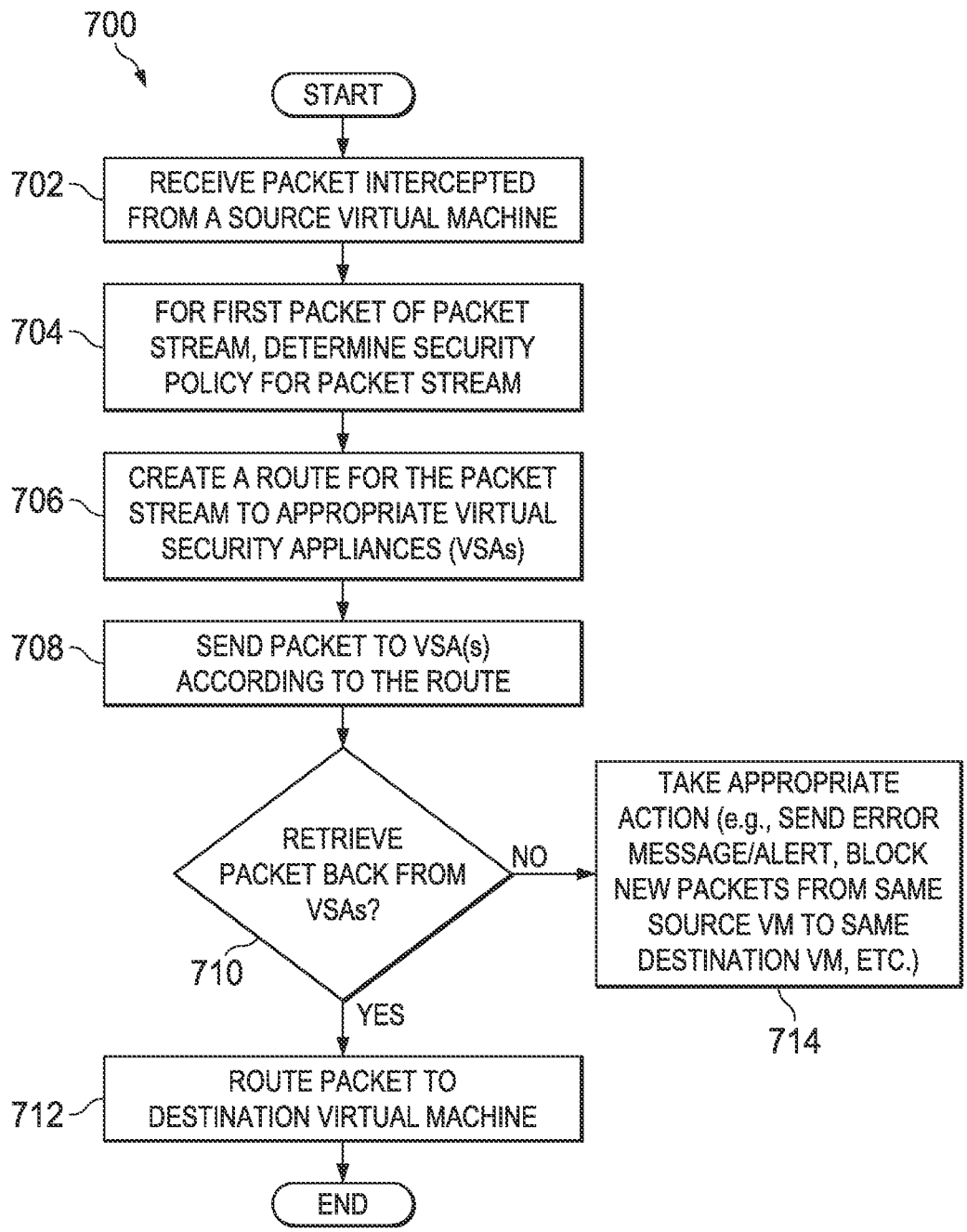
FIG. 7 is a simplified flowchart illustrating a method for routing streams of a source virtual machine in accordance with an embodiment of the system.

FIG. 7 is a simplified flowchart illustrating an embodiment of a process of a distribution manager. For ease of reference, distribution manager 380 and other components of FIG. 3 are referenced, although flow 700 may be applicable to various embodiments of the distribution manager and virtual security system described herein. One or more activities of flow 700 may be performed by routing module 384 in distribution manager 380.

At 702, distribution manager 380 receives a packet that was intercepted from a source guest virtual machine. At 704, for a first packet of a packet stream, the distribution manager may determine a security policy for the packet stream. In one embodiment, the distribution manager may search VM security policies database 386 to determine the identities of the VSAs that should process the packet stream. In another embodiment, the distribution manager may query policy manager 370. Policy manager 370 may provide the appropriate security policy for the source guest virtual machine, to be applied to the packet stream. The security policy can include the identities of the VSAs that should process the packet and the order in which the VSAs should process the packet. The identities (e.g., MAC addresses) of each VSA in the security policy may be added to each entry in streams database 382 that is associated with the packet stream.

At 706, the distribution manager creates a route for the packet to the appropriate VSAs. The source route can be derived from streams database 382. From data in one or more entries of streams database 382 that are associated with the packet stream, the distribution manager creates a source route through the required VSAs 340. For some embodiments, the distribution manager may modify the packet to include the source route, and thus enable VSAs that receive the packet to forward the packet appropriately.

At 708, the distribution manager can send the packet to the first VSA identified in the source route. At 710, it is determined whether the distribution manager has received the packet back from the VSAs. If the distribution manager has received the packet, then it can be assumed that the packet either passed the security inspection of all of the VSAs, or that the packet was modified by one or more of the VSAs to comply with their particular security inspection requirements (e.g., firewall policies, antivirus scan, etc.)

If the packet is received by the distribution manager, then at 712, the distribution manager can route the packet to its original destination. For example, the destination may be another guest virtual machine on the same virtual server, or may be another guest virtual machine on a different virtual server.

If the packet is not received back by the distribution manager, such as after a specific amount of time has elapsed with no packet received, or if a VSA sends a message indicating the packet was dropped, then any appropriate action may be taken by the distribution manager (as shown generally at 714). Actions could include, but are not limited to, sending error messages, sending alerts to a system administrator or other authorized user, and blocking new packets from the same source guest virtual machine. In an embodiment, the distribution manager may determine to take certain actions after a certain period of time passes without receiving the packet, or after receiving a notification from a VSA that the packet did not pass security inspection.

Figure 8:
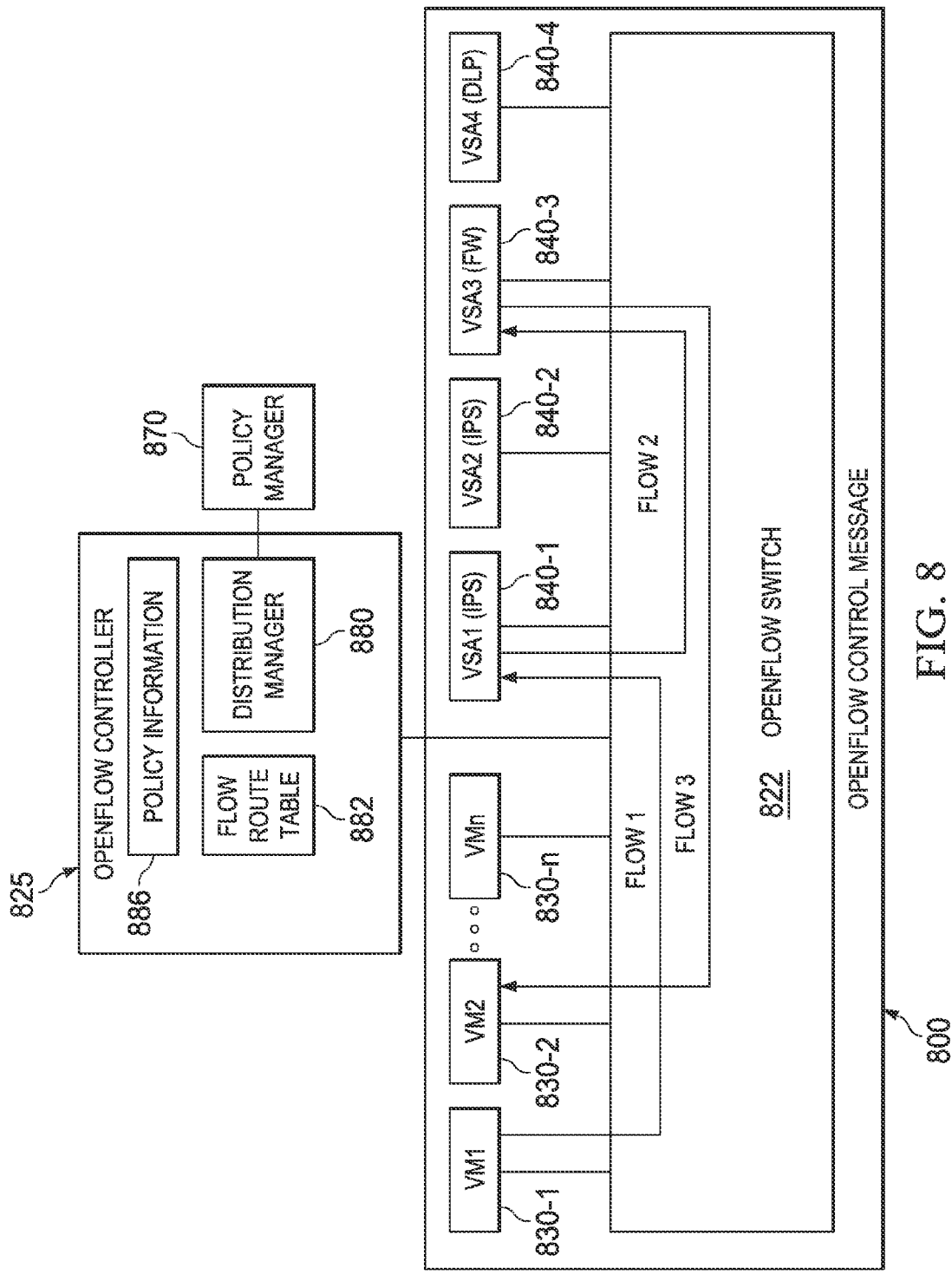
FIG. 8 is a block diagram illustrating an interception mechanism in accordance with an embodiment of the system using an OpenFlow switch.

FIG. 8 is a block diagram illustrating yet another example implementation of an intercept mechanism. In the embodiment of FIG. 8, an OpenFlow switch 822 is configured as an intercept mechanism for the virtual security system. Typically, a decision-making algorithm for new network traffic flows is performed in a switch. An OpenFlow switch, however, is a switching concept in which a decision-making algorithm for new network traffic flows is separated from the switch's datapath, and its control path component may reside on a different physical machine. In the OpenFlow scheme, when the OpenFlow switch receives a packet from an existing, known traffic flow, the packet is routed based on known flow routes for the received traffic. When a new flow is initiated and detected by the OpenFlow switch, however, a controller process of an OpenFlow controller can be notified across the virtual network infrastructure with flow parameters. The OpenFlow switch can manage existing network traffic flows, but an additional mechanism, which is external to the OpenFlow switch, can control the generation of flow routes for new network traffic flows. The OpenFlow scheme is described in more detail in the "OpenFlow Switch Specification," Version 1.2 (Wire Protocol 0x03), published Dec. 5, 2011, by The Open Networking Foundation.

In an embodiment using an OpenFlow switch, intercept and source route mechanisms may be optimized directly into the switching architecture. Consequently, a separate source routing mechanism can be omitted when a controller for the OpenFlow switch is provided with a distribution manager module that can implicitly configure multiple network flow segments of a complete flow at once.

A distribution manager module may be integrated into the OpenFlow controller process for the switch. The distribution manager module can generate the flow routes needed to route packets of a new flow through virtual security appliances via the OpenFlow switch, by inserting multiple flows to cover the transit of a new flow through VSAs in accordance with its configured policy. The last such inserted flow eventually routes the packet via the OpenFlow switch to the destination intended by the source of the new flow. In an embodiment, the OpenFlow controller process can either control all new flows for the switch or can plug into the normal controller software to override certain decisions. Thus, the distribution manager functions, as previously described herein, are subsumed in the OpenFlow switch by the OpenFlow switch controller.

FIG. 8 illustrates an example implementation of an embodiment using an OpenFlow switch 822 in a virtual server 800. Virtual server 800 and its components may be configured in the same or similar manner as described with reference to virtual server 300 in FIG. 3. Virtual server 800 may be configured with virtual machines (VMs) 830-1 through 830-n, and with virtual security appliances (VSAs) 840-1 through 840-4. For ease of illustration, only four VSAs are shown in virtual server 800, including two intrusion prevention systems (IPS) VSAs 840-1 and 840-2, a firewall (FW) VSA 840-3, and a data loss prevention (DLP) VSA 840-4. It will be apparent, however, that any number and type of VSAs could be configured in a virtual server to provide various security inspections on network traffic from virtual machines.

An OpenFlow controller 825 is also provided in the virtual network infrastructure and includes policy information 886, a flow route table 882, and a distribution manager module 880. In an embodiment, distribution manager module 880 may be a plug-in for open source controller 825. A policy manager 870 may also be configured to communicate with OpenFlow controller 825 and, more particularly, with distribution manager module 800. In addition to other functions, policy manager 870 may provide policy information updates to policy information 886, which may be stored in any suitable form (e.g., database, tables, queues, cache, etc.). In an embodiment as shown, OpenFlow controller 825 could be configured somewhere in the virtual network infrastructure external to virtual server 800. In another embodiment, OpenFlow controller 825 may be configured in virtual server 800 with OpenFlow switch 822.

In OpenFlow controller 825, a source route is implicit when a flow route is generated. This enables the switch hardware to automatically handle all packets in a flow (after the initial packet), and may eliminate the need to process each packet.

Example flow segments (i.e., flow-1, flow-2, and flow-3) are shown in FIG. 8 to illustrate a possible operational scenario of a virtual security system with an OpenFlow switch having a distribution manager module. For purposes of illustration, assume VM 830-1 initiates a communication to VM 830-2. VM 830-1 can attempt to send an initial connection packet to VM 830-2. OpenFlow switch 822 can send a control packet to OpenFlow controller 825 indicating it received an initial connection packet. Standard software may be configured in OpenFlow controller 825 to build flow tables with a flow route from VM 830-1 to VM 830-2. Distribution manager module 880 can override any standard software. Instead, distribution manager module 880 can identify one or more policies of policy information 886 that are applicable to the source of the connection packet, VM 830-1. In an embodiment, policy information 886 may be stored in a database or other memory element of OpenFlow controller 825, or may be stored in any other location in the virtual network infrastructure that is accessible to OpenFlow controller 825.

In this example scenario, the policies in policy information 886 indicate that network traffic from VM 830-1 is to be routed through IPS VSA 840-1 and FW VSA 840-3. Accordingly, distribution manager module 880 can create three flow segments: flow-1 from VM 830-1 to IPS VSA 840-1, flow-2 from IPS VSA 840-1 to FW VSA 840-3, and flow-3 from FW VSA 840-3 to VM 830-2. These flow segments can be stored in flow route table 882. The creation of the flow segments causes the security routing for the specified connection to happen automatically. Distribution manager module 880 can also tie flow segments 1, 2, and 3 to both the port number and layer 2 (L2) information to increase the specificity of the route provided.

When the network traffic is completed or the connection times out, OpenFlow controller 825 may be notified by OpenFlow switch 822. The flow route segments in flow route table 882 can be deleted. In one embodiment, distribution manager module 880 may associate the three flow segments when storing them in flow route table 882. In another embodiment, distribution manager module 880 may re-derive the flow segments from policy information 886 and delete the flow segments from flow route table 882.

In another embodiment, the three flow segments may also be programmed into OpenFlow switch 822 incrementally, as each flow segment appears. This requires some bookkeeping by distribution manager module 880. This embodiment may depend upon the particular capabilities of OpenFlow switch 822.

Figure 9:
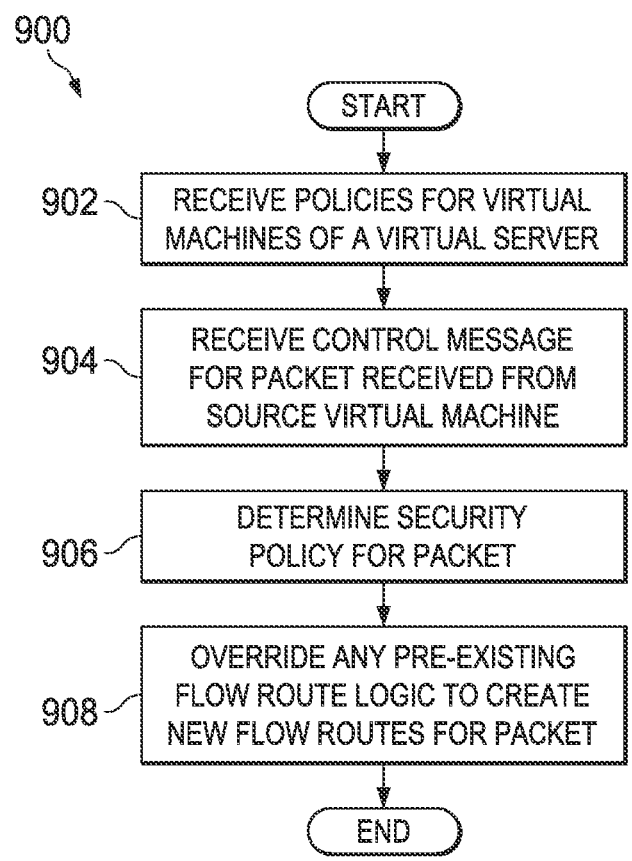
FIG. 9 is a simplified flowchart illustrating a process of an interception mechanism in accordance with an embodiment of the system using an OpenFlow switch.

Turning to FIG. 9, FIG. 9 is a simplified flowchart illustrating a method for an OpenFlow controller process in accordance with an embodiment. A flow 900 may be a process performed by distribution manager module 880 in OpenFlow controller 825, at least partly when OpenFlow switch 822 receives new network traffic from a guest virtual machine.

At 902, OpenFlow controller 825 may receive policies for guest virtual machines of a virtual server. These policies may be updated policies or new policies that are stored with policy information 886. At 904, distribution manager module 880 receives a control message for a packet received by OpenFlow switch 822 from one virtual machine, such as guest VM 830-1 to another virtual machine, such as guest VM 830-2.

At 906, distribution manager module 880 determines the security policy for the packet from policy information 886. Any pre-existing logic of OpenFlow controller 825 that generates flow routes from the source guest VM to the destination guest VM can be overridden at 908. A new flow route, with potentially multiple flow route segments, can be created by distribution manager module 880 and provided to OpenFlow switch 822, to route the packet according to the new flow route. OpenFlow switch 822 will consider each flow segment as an independent flow, with enough specification (such as port numbers) to distinguish it from other flows within the switch 822. The new flow route may include one or more virtual security appliances to which the packet is sent before being forwarded to its actual destination, guest VM 830-2.

Figure 10:
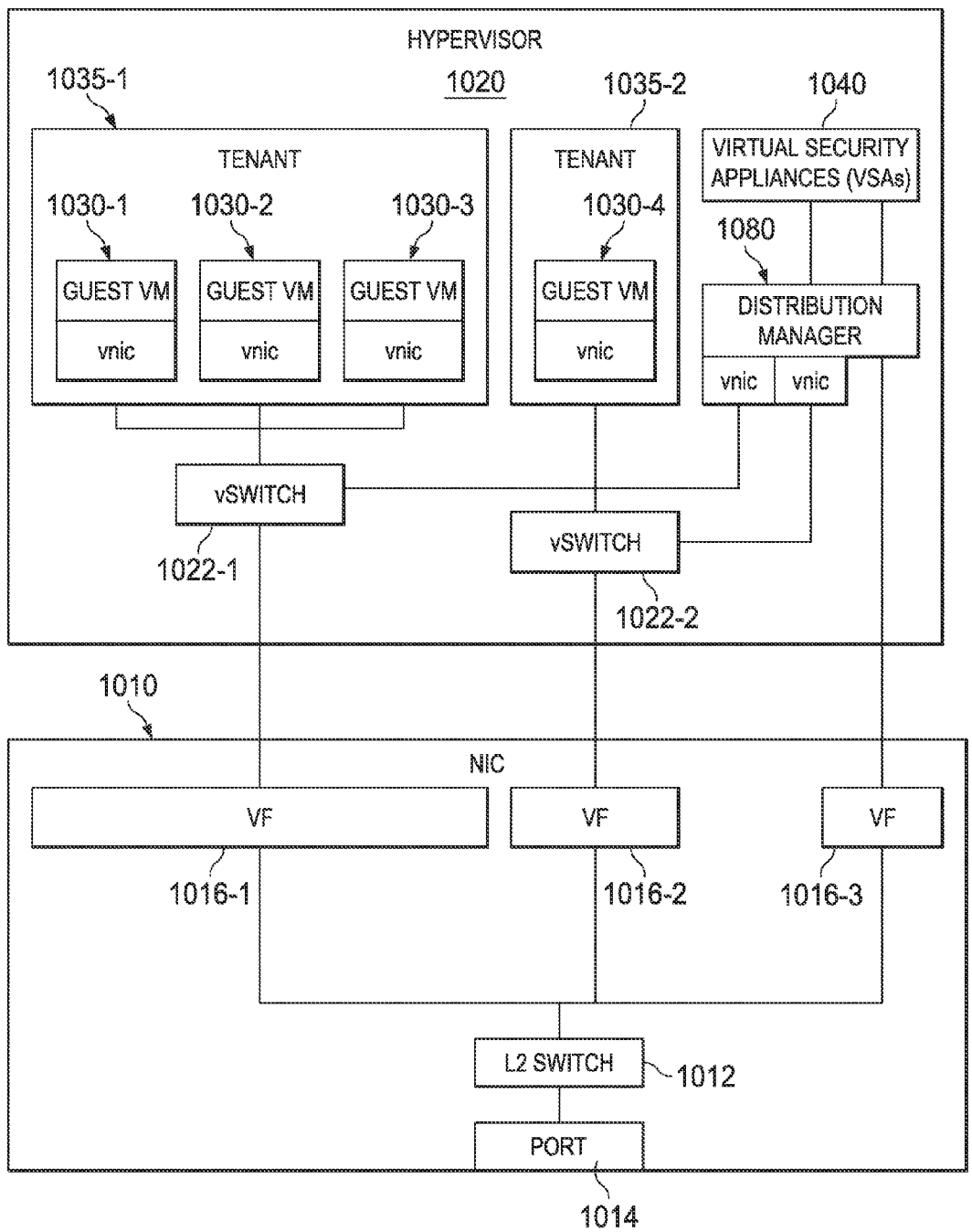
FIG. 10 is a block diagram illustrating an example scenario of a hardwired interception mechanism in accordance with an embodiment of the system.
Figure 11:
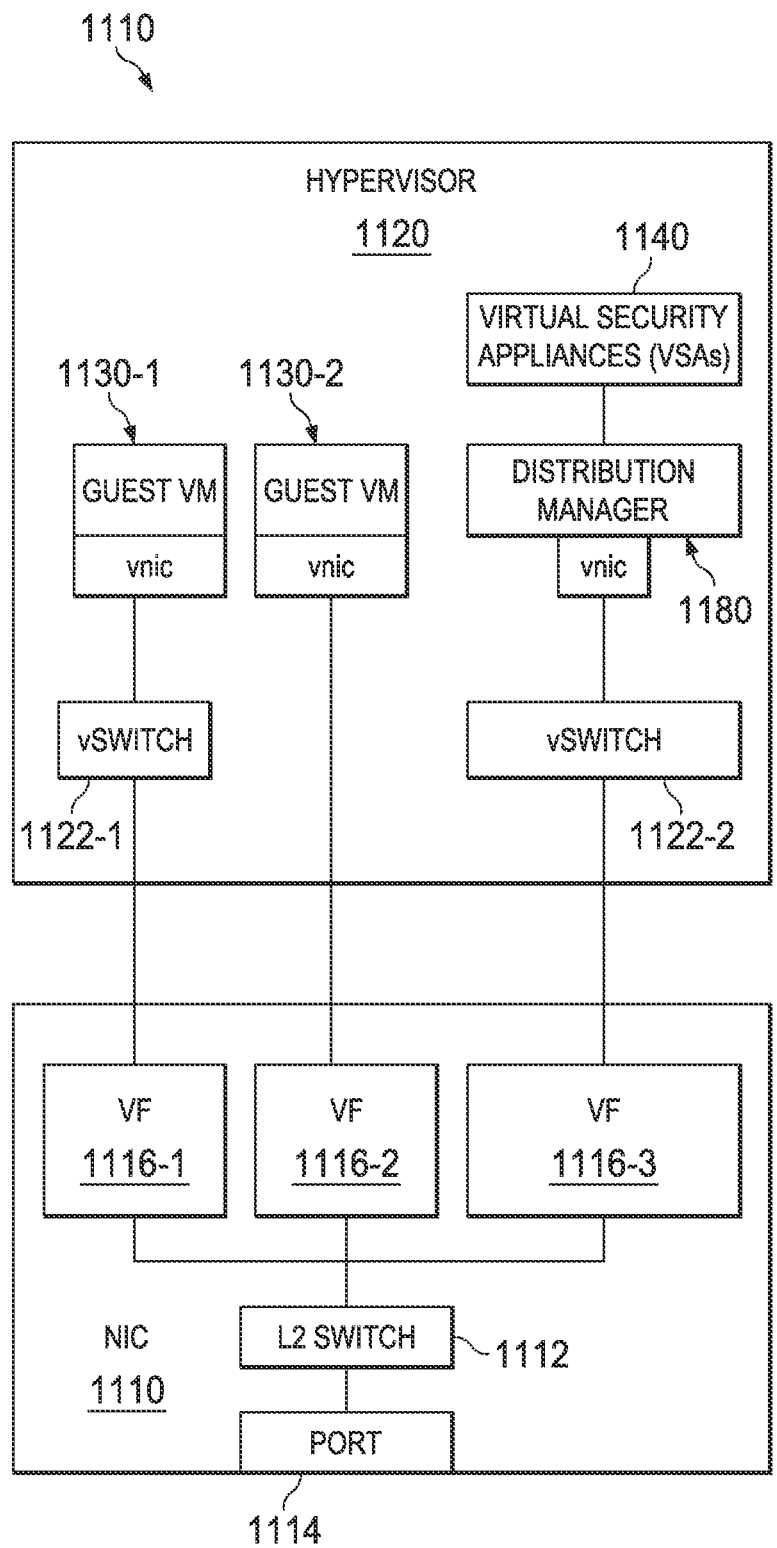
FIG. 11 is a block diagram illustrating an example scenario of a hardwired interception mechanism in accordance with another embodiment of the system.

FIGS. 10 and 11 illustrate example implementations of a hardware intercept mechanism of intercept layer 190 of FIG. 1 in virtual servers 1000 and 1100, respectively. In a hardware intercept mechanism, a hypervisor is told to "wire" a virtual network interface card to a physical network interface. This is not a physical wiring, but a virtual wiring, which reconfigures a network traffic path to flow from a vNIC on a guest VM to a physical NIC. More specifically, the hypervisor is configured to avoid performing its virtualization functions for a designated interface. As a result, the guest VM can gain direct access to physical hardware. The hardware of the physical interface implements the desired switching and interception.

One mechanism for implementing hardware interception is to use a data plane direct memory access (DMA) mechanism to transfer data from a virtual machine. DMA is a feature that allows certain hardware subsystems of a computer to access system memory independently of a processor (i.e., central processing unit (CPU)).

An example for implementing DMA is the standard Single Root Input/Output Virtualization (SR-IOV) mechanism. SR-IOV removes the hypervisor from the process of moving data to and from a virtual machine. Instead, data is moved directly to and from the virtual machine, and thus bypasses the hypervisor including its virtual switch. SR-IOV permits one or more interfaces on a physical NIC to implement a two-way DMA channel (called a virtual function) directly to a virtual machine. Thus, a single physical NIC is capable of exposing a multitude of virtual interfaces directly usable by either virtual machines or virtual switches. Some hypervisors and some NICs implement the SR-IOV specification. By using an SR-IOV compatible NIC and hypervisor, packets from a given virtual machine may be intercepted (i.e., bypass the hypervisor and its virtual switch) into a physical NIC. The intercepted packets may be redirected from one virtual function to another virtual function by the built-in L2 switch in the NIC. The other virtual function can be assigned to the distribution manager who receives intercepted traffic from that virtual machine.

In some physical NICs, multiple SR-IOV channels feed into a switch on the physical NIC. In this case, the virtual functions from each virtual machine or virtual switch can be adjusted, for example, by reconfiguring the NIC so that they each redirect to the virtual function dedicated to the distribution manager. This permits the Distribution Manager to intercept, process and reroute packets without special purpose hardware.

In FIG. 10, a hypervisor 1020 is shown with guest virtual machines 1030-1 through 1030-4, virtual switches 1022-1 and 1022-2, and other virtual machines that include a distribution manager 1080 and one or more VSAs 1040. In FIG. 10, interception is configured at a virtual switch layer, rather than at a virtual machine layer. Thus, interception occurs between the virtual switches. In FIG. 10, tenant 1035-1 includes guest virtual machines (VMs) 1030-1, 1030-2, and 1030-3, and tenant 1035-2 includes guest virtual machine (VM) 1030-4. A virtual NIC (vNIC) enables each of the guest VMs and distribution manager to communicate to one or both vSwitches 1022-1 and 1022-2. In an example implementation, tenants 1035-1 and 1035-2 can represent strategically and/or logically grouped GUEST VMs (e.g., finance group, accounting group, engineering group). Traffic between machines in a tenant, such as virtual machines 1030 in tenant 1035-1, are not intercepted and so are not affected by the security apparatus. Consequently, it may be desirable to carefully allocate virtual machines to vSwitches.

The vNICs of guest VMs 1030-1 through 1030-3 send packets to and receive packets from vSwitches 1022-1 and 1022-2. At the intercept layer, a physical network interface card (NIC) 1010 runs SR-IOV and includes a port 1014, a layer 2 (L2) switch 1012, and virtual functions (VFs) 1016-1 through 1016-3. VFs 1016 allows connection to guest VMs 1030 via vSwitches 1022. Accordingly, in this implementation, connection from VFs 1016 is to an edge layer of vSwitches 1022 rather than directly to guest VMs 1030.

Distribution manager 1080 may be provided to enable routing of flows from particular guest VMs 1030 according to predefined policies. Based on the predefined policies, one or more virtual security appliances 1040 may be configured in virtual server 1000. Moreover, distribution manager 1080 may implement any of the aforementioned source routing mechanisms to route packets to policy-specified VSAs in a desired order.

For purposes of illustration, consider an example packet flow from VM 1030-1 to VM 1030-4. When VM 1030-1 sends a packet to VM 1030-4, the packet flows through vSwitch 1022-1 and needs to connect to VM 1030-4 through vSwitch 1022-2. The intercept layer is configured to force the packet to go through hardware (i.e., NIC 1010). The packet flows through VF 1016-1 and into physical L2 switch 1012. L2 switch 1012 sends the packet to distribution manager 1080.

Distribution manager 1080 can be configured with any of the previously described source route mechanisms. If a policy is applicable to the packet flow from VM 1030-1, then the packet is routed through one or more VSAs 1040, in accordance with the policy, to have appropriate security inspections. If the packet successfully passes the one or more VSA security inspections, then the packet may be routed back to distribution manager 1080, which can then route the packet to vSwitch 1022-2. The packet is then forwarded to the destination VM 1030-4 from vSwitch 1022-2.

The return network traffic from VM 1030-4 to VM 1030-1 may also be intercepted and routed through appropriate security controls. A packet from VM 1030-4 flows through vSwitch 1022-2 and needs to connect to VM 1030-1 through vSwitch 1022-1. The intercept layer (e.g., using SR-IOV) forces the packet to go through NIC 1010. The packet flows through VF 1016-3 and into physical L2 switch 1012. L2 switch 1012 sends the packet to distribution manager 1080 via VF 1016-3.

If a policy is applicable to the packet flow from VM 1030-4, then the packet is routed through one or more VSAs 1040, in accordance with the policy, to have appropriate security inspections. If the packet successfully passes the one or more VSA security inspections, then the packet may be routed back to distribution manager 1080, which can then route the packet to vSwitch 1022-1. The packet is then forwarded to the destination guest VM 1030-1 from vSwitch 1022-1.

In some embodiments, the distribution manager may determine, such as at the beginning of a new flow, that no security inspection is needed for the flow. In some embodiments, the hardware of NIC 1010 supports a configuration to route subsequent packets in these flows directly to their destination vSwitch, without needing to flow through the distribution manager.

In FIG. 11, a hypervisor 1120 is shown with guest virtual machines 1130-1 and 1130-2, virtual switches 1122-1 and 1122-2, and other virtual machines such as a distribution manager 1180 and one or more VSAs 1140. In FIG. 11, interception is configured partially at a virtual machine layer, in which the vNIC of guest VM 1130-2 is wired to a physical network interface card (NIC) 1110 with an L2 switch 1112. Thus, NIC 1110 implements the desired switching and interception for guest VM 1130-2. SR-IOV runs on NIC 1110 and effectively removes hypervisor 1120 and its virtual switch (vSwitch) 1122 from the process of moving data to and from guest VM 1130-2. Virtual function 1116-2 is configured as two-way DMA channel directly to guest VM 1130-2. Therefore, virtual switches in hypervisor 1120, such as vSwitch 1122-1, are bypassed by guest VM 1130-2. Network traffic from guest VM 1130-2 is effectively intercepted into NIC 1110. Interception of network traffic from guest VM 1130-1 is at the virtual switch layer and may be configured as described with reference to guest VMs 1030 of FIG. 10. An external routing mechanism, such as L2 switch 1112 can forward packets from both guest VMs 1130 to distribution manager 1180.

In FIG. 11, distribution manager 1180 may be provided to enable routing of flows from particular guest VMs 1130 according to predefined policies. Based on the predefined policies, one or more virtual security appliances 1140 may be configured in virtual server 1100. Moreover, distribution manager 1180 may implement any of the aforementioned source routing mechanisms to route packets to policy-specified VSAs in a desired order. In the example illustration of FIG. 11, distribution manager 1180 is connected to NIC 1110 through vSwitch 1122-2 and VF 1116-3. This enables distribution manager 1180 to communicate with guest VM 1130-2, which has a direct connection into NIC 1110.

Figure 12:
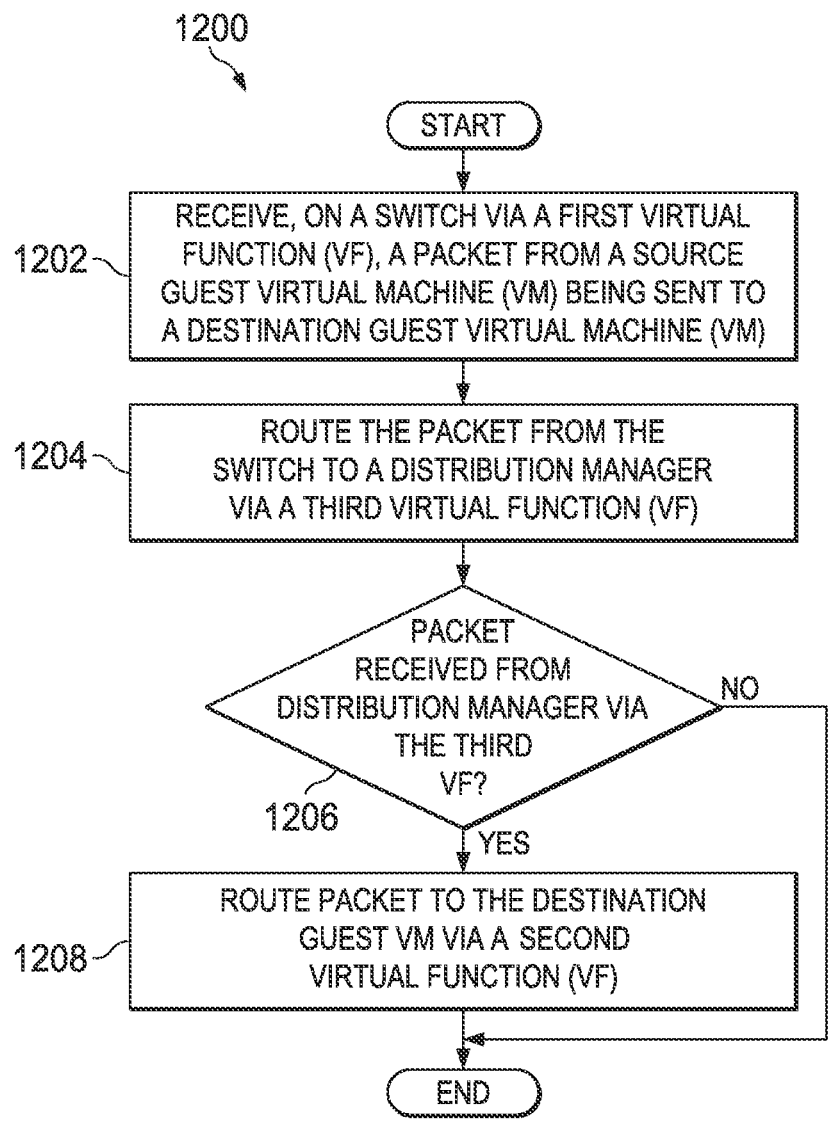
FIG. 12 is a simplified flowchart illustrating a process of a hardware interception mechanism in accordance with an embodiment of the system.

FIG. 12 is a simplified flowchart illustrating some potential operations that may be associated with a hardware interception as shown in FIGS. 10 and 11. A flow 1200 illustrates the potential operations that may be performed by an intercept mechanism implemented in a hardware layer of a virtual server. For ease of explanation, the components of FIG. 11 are referenced in the following description of flow 900.

At 1202, L2 switch 1112 receives a packet from a source guest VM 1130-1. The packet is addressed to a destination guest VM 1130-2 and is received by L2 switch 1112 via virtual function (VF) 1116-1. The packet is forwarded to distribution manager 1180 via VF 1116-3 and vSwitch 1122-2. In an embodiment, NIC 1110 may permit a change to L2 switch 1112 NIC to enable appropriate routing to distribution manager 1180. Packets from guest VM 1130-1 are automatically routed to a special hardware port (i.e., a queue) connected to the distribution manager. Thus, NIC 1110 is modified to allow SR-IOV functions feeding into the NIC.

When distribution manager 1180 receives the packet, it determines whether the packet stream associated with the packet is subject to any security policies. If so, then distribution manager 1180 may be configured to route the packet to policy-specified VSAs using any of the aforementioned source routing mechanisms. If the packet successfully passes security inspections from the VSAs through which it is routed, then distribution manager 1180 can send the packet back to switch 1112 via VF 1116-3.

At 1206, if the packet is not received by switch 1112 from distribution manager 1180 via VF 1116-3, then flow 1200 ends. However, if the packet is received via VF 1116-3, then at 1208, the packet may be routed to its original destination guest VM 1130-2. In this case, the packet is transferred directly from the hardware of NIC 1110 into guest VM 1130-2 via 1116-2, and thus bypasses vSwitches 1122-1 and 1122-2.

Figure 13:
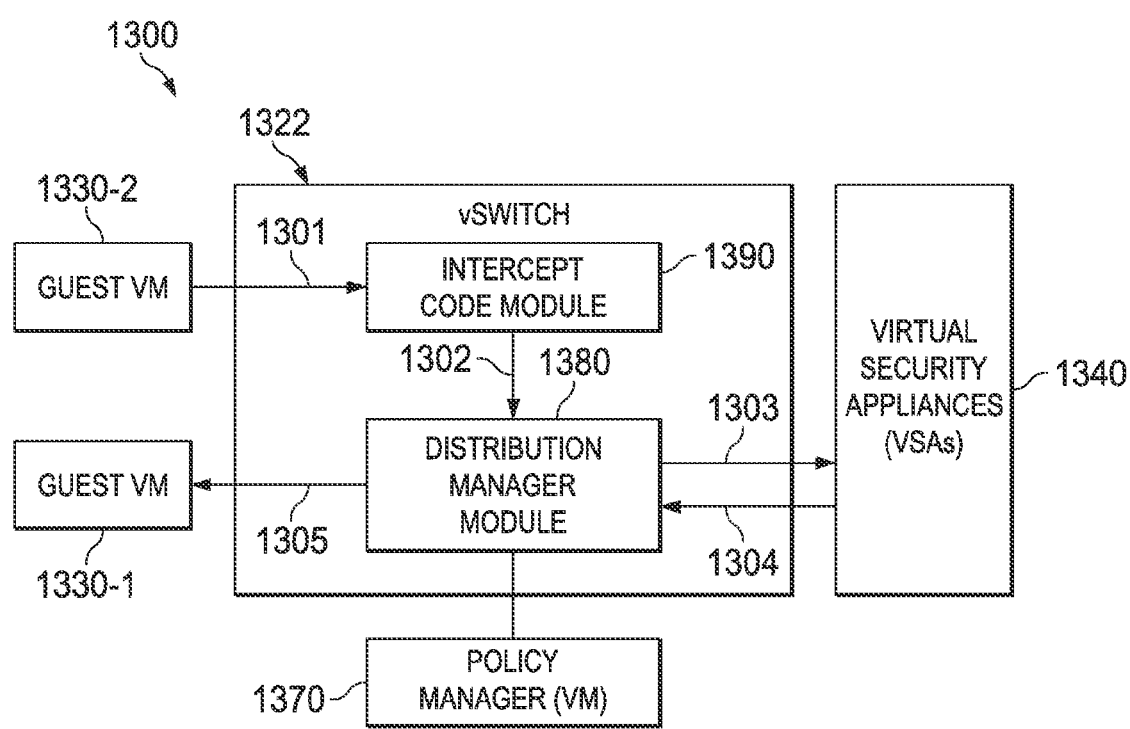
FIG. 13 is a block diagram illustrating an example scenario of a another interception mechanism in accordance with an embodiment of the system.

FIG. 13 illustrates an example implementation of leveraging a hypervisor that offers an internal interception mechanism in which a code module is able to intercede with a virtual switch of the hypervisor as network traffic passes through the virtual switch. In this implementation, a distribution manager module is co-located with the virtual switch itself, and can have access to every packet that flows through the virtual switch. Additionally, the distribution manager module can be configured to force a packet to flow through desired virtual security appliances, as required by policies applied to the packet's source virtual machines.

In FIG. 13, a virtual server 1300 is shown with guest virtual machines (guest VMs) 1330-1 and 1330-2. Virtual security appliances 1340 represents one or more VSAs configured to apply security inspections to network traffic from guest VMs of virtual server 1300. A virtual switch (vSwitch) 1322 includes an intercept code module 1390 and a distribution manager module 1380. A policy manager 1370 may be configured as another virtual machine of virtual server 1300, or of another virtual server. Alternatively, policy manager 1370 could be included with system-wide management services hosted directly on a physical server. Virtual server 1300 and its components may be configured in the same or similar manner as described with reference to virtual server 300 of FIG. 3.

In an example illustration, assume guest VM 1330-1 sends a message to guest VM 1330-2. A packet of a network flow is sent at 1301 to guest VM 1330-2, but is intercepted by intercept code module 1390 in vSwitch 1322. Intercept code module 1390 sends, at 1302, the intercepted packet to distribution manager module 1380. Distribution manager module 1380 obtains a policy to determine where to route the packet. In example embodiments, the policy could be obtained from a policy database that is kept updated by policy manager 1370, or could be obtained by querying policy manager 1370.

Distribution manager module 1380 may modify the packet to include network addresses (e.g., MAC addresses) for each VSA of the policy. Alternatively, the packet could be forwarded to another vSwitch to be routed through VSAs. At 1303, distribution manager module 1380 sends the packet to the selected one or more VSAs 1340. If all of the security inspections are performed successfully, then at 1304, the packet is sent back to distribution manager module 1380. Distribution manager module 1380 can then forward the packet to its destination VM 1330-2.

Another possible intercept mechanism involves implementing a switching element as a private virtual local area network (PVLAN), with a distribution manager on an uplink port. In a PVLAN, one port can be designated as the uplink port. Packets sent from any other port are always routed to the uplink regardless of destination media access control (MAC) address or VLAN. A packet that is introduced through the uplink port is delivered as usual for a switch (e.g., according to the destination MAC address).

In this configuration, all packets are transmitted to the distribution manager, and the distribution manager can route packets to any other virtual machine, based on the original MAC address. In this intercept mechanism, every packet requires at least one extra hop, to and from the distribution manager.

Figure 14:
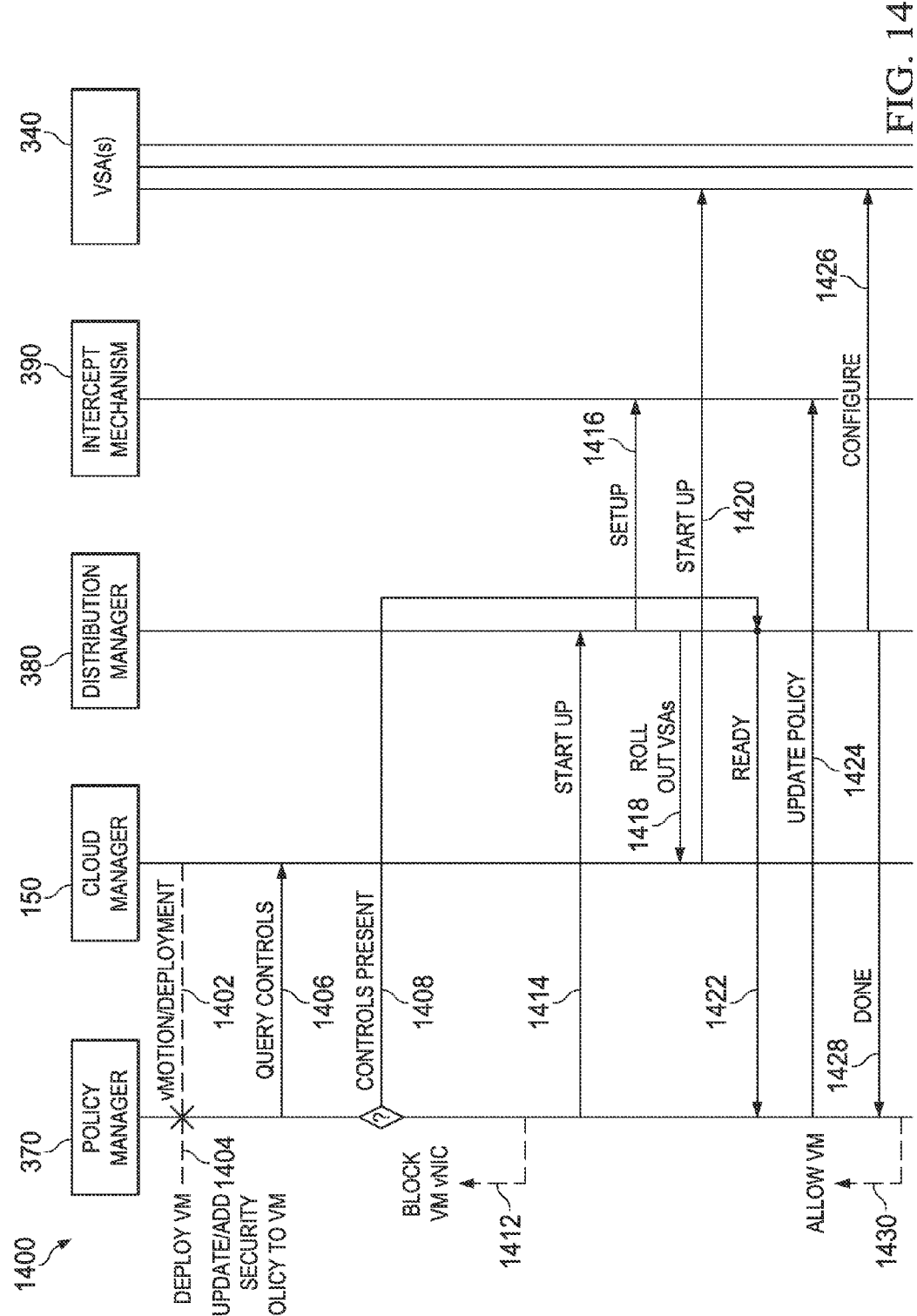
FIG. 14 is a simplified interaction diagram illustrating additional potential operations of an embodiment of the system.

Turning to FIG. 14, a simplified interaction diagram illustrates potential operations associated with virtual machine changes in a virtual security system. More particularly, FIG. 14 illustrates a scenario in which a new virtual machine is deployed or an existing virtual machine is moved within a virtual cloud infrastructure. Additionally, FIG. 14 illustrates a scenario in which a security policy is updated or added to a virtual machine within a virtual cloud infrastructure. The interacting components of FIG. 14 include policy manager 370, distribution manager 380, intercept mechanism 390, and virtual security appliances (VSAs) 340 of FIG. 3. Also included is cloud manager 150 of FIG. 1, which can interact with policy manager 370 (in policy layer 170) and distribution manager 380 (in distribution layer 180). The components of FIG. 14 may include any of the various embodiments of such components as disclosed herein.

At 1402, a user moves an existing guest virtual machine from one location to another location within a virtual cloud infrastructure via a cloud manager 150. For example, a guest virtual machine may be moved from a first virtual server to virtual server 300, with each having separate hypervisors and different underlying hardware. Cloud manager 150 may provide a live migration of a virtual machine from one physical server to another. One solution that provides this capability is VMware® vMotion™ offered by VMware, Inc., of Palo Alto, Calif.

In another scenario, at 1404, a user may deploy a new guest virtual machine to a virtual cloud infrastructure via cloud manager 150. Cloud manager 150 allocates the new guest virtual machine on virtual server 300. In yet another example, a user may update or add a security policy to an existing virtual machine within a virtual cloud infrastructure. The mechanisms for adding new virtual machines and moving existing virtual machines may be managed by a cloud manager (e.g., cloud manager 150 of FIG. 1), as previously described herein. The mechanisms for adding a new security policy to a new guest VM being added or to an existing guest virtual machine, however, could be implemented separately. For example, a security manager (e.g., security manager 175 of FIG. 1) may provide a user interface to allow authorized users to update or add security policies to new or existing guest virtual machines. The security manager may communicate updated or new security policies to the policy manager, or could enable direct security policy database updates (e.g., VMM security policies database 376. For ease of reference, FIG. 14 will be further explained with reference to adding or moving a guest virtual machine. However, it is to be understood that one or more of the activities described in FIG. 14 could be performed when security policies are added or updated for an existing guest VM.

In each scenario, policy manager 370 can detect signals from cloud manager 150 indicating that a new guest virtual machine is being deployed or that an existing guest virtual machine is being moved within the virtual cloud infrastructure. In an embodiment, an application programming interface (API) may be used to detect the signals. Upon detecting the signals, policy manager 370 may facilitate the creation and/or configuration of an intercept mechanism 390 in a location (e.g., a virtual server) where the guest virtual machine is being deployed or moved. Policy manager 370 may also facilitate the creation and/or configuration of appropriate virtual security appliances 340.

At 1406, policy manager 370 may query cloud manager 150 to determine whether any security controls are required by policy for the guest virtual machine. For example, the user may have requested that an intrusion prevention system (IPS) and a firewall (FW) be applied to certain network traffic from the guest virtual machine.

If security controls are specified for the guest virtual machine, then at 1408, policy manager may query distribution manager 380, which may be configured as a virtual machine on the virtual server where the guest virtual machine is being deployed or moved. The query can determine whether the specified security controls for the guest virtual machine are already provisioned on the virtual server, in the form of virtual security appliances (VSAs) 340. If the requested security controls are present in the virtual server, then at 1422, distribution manager 380 can send a message to policy manager 370 indicating that the requested VSAs are present.

At 1412, policy manager 370 may block the guest VM and not allow it to run in virtual server 300, until appropriate VSAs are set up. In some embodiments, there may not be a mechanism to block the guest VM, and step 1412 may seek to limit the security exposure while VSAs are starting up by blocking or otherwise routing traffic to and from the guest VM. For example, if the guest VM is being moved to another virtual server, the traffic from the guest VM might be routed back to another server, such as using a trombone route, to use an existing VSA until the new VSAs are running. At 1414, policy manager may send a request to distribution manager 380 to configure an intercept mechanism, if necessary. In some embodiments, the intercept mechanism may be configured by distribution manager 380.

At 1416, distribution manager may configure intercept mechanism 390. Typically, intercept mechanism 390 may be configured in virtual switches, or may be inherently present in an OpenFlow switch embodiment. At 1418, the distribution manager may also send a request to cloud manager 150 to create the required VSAs. Upon receiving a request, at 1418, cloud manager 150 can dynamically create VSAs 340 that are specified in the guest VM's security policy. Cloud manager 150 can use an image store with a virtual machine template that allows cloud manager 150 to essentially copy a VSA to create a new one in virtual server 300.

In some embodiments, an intercept mechanism may be configured after a VSA is allocated. For example, in hardware interception, once a VSA is allocated, certain virtual switches and vNICs may need to be reconfigured (or "rewired") to force network traffic to go through the hardware intercept configuration.

Once the appropriate VSAs are created, at 1422, distribution manager 380 sends a ready signal to policy manager 370. Policy manager may then, at 1424, update security policies on distribution manager. At 1426, distribution manager 380 configures the new VSAs (or existing VSAs). At 1428, distribution manager 380 can send a message to policy manager 370 indicating the VSAs have been created and configured, and that intercept mechanism 390 is configured. At 1430, policy manager 370 can allow the guest VM to run.

In another scenario, a new guest VM may be deployed to a virtual server where no security controls have been configured yet. Thus, a distribution manager may not have been created in the targeted virtual server. In this instance, policy manager 370 may send a request to cloud manager 150 to create a distribution manager at the targeted virtual server. Because distribution manager can be configured as a virtual machine, cloud manager 150 can use a virtual machine template for a distribution manager to copy a distribution manager to create a new distribution manager in the targeted virtual server.

In another embodiment, some or all of the functionalities of policy manager 370 and distribution manager 380 may be integrated into a single virtual machine. Furthermore, some or all of the functionalities of policy server 370 and/or distribution manager 380 may be combined with a VSA. In one particular embodiment, the policy manager may retain its separate functionality, and the functionalities of the distribution manager may be combined with a VSA or dispersed across two or more VSAs. In another embodiment, some, but not all, of the functionalities of the distribution manager may be performed by the policy manager. An integrated policy manager may detect guest VMs being changed (e.g., guest VM being added or moved to a targeted virtual server, new or updated policy requested for an existing guest VM). The integrated policy manager can communicate with cloud manager 150 to determine whether a security policy applies to the guest VM. If a policy applies to the guest VM, then the integrated policy manager can determine whether policy-specified VSAs are present in the virtual server and block the guest VM if VSAs need to be created to comply with the policy. The integrated policy manager can also configure an intercept mechanism in certain embodiments, can request cloud manager 150 to create any needed VSAs, and can configure the VSAs. Once the appropriate security controls are configured in the virtual server, the integrated policy manager can allow the guest VM to run.

Figure 15:
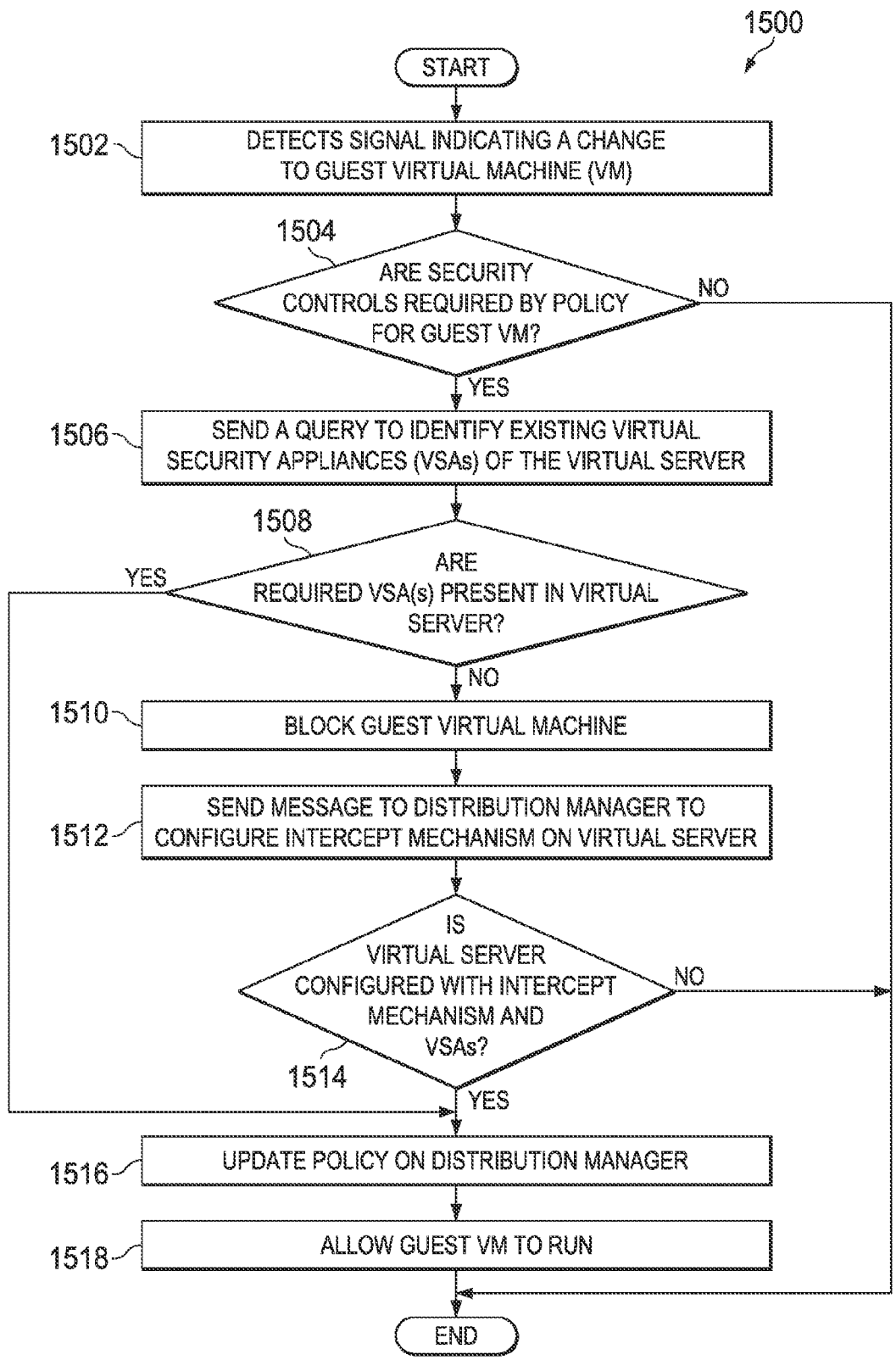
FIG. 15 is a simplified flowchart illustrating a process of a policy manager in accordance with an embodiment of the system.

FIG. 15 is a simplified flowchart illustrating an embodiment of a process of a policy manager. For ease of reference, policy manager 370 and other components of FIG. 3 are referenced, although flow 1500 may be applicable to various embodiments of the policy manager and virtual security system described herein. In an embodiment, one or more activities of flow 1500 may be performed by policy module 374 in policy manager 370.

At 1502, policy manager 370 detects a signal indicating a change to a guest virtual machine within a virtual cloud infrastructure of communication system 100. One example of a change to a guest VM that could be detected by policy manager 370 includes an existing guest VM being moved from one virtual server to another virtual server that has a different hypervisor and different underlying hardware. Another example of a change that could be detected includes a new guest VM being added to a virtual server. A further example of a change that could be detected includes a new or updated policy requested for an existing guest virtual machine.

At 1504, a determination is made as to whether security controls are specified by policy for the guest VM. In an embodiment, policy manager 370 may query a cloud manager to determine whether a security policy applies to the guest VM. In an embodiment, policy manager 370 may query a master security policies database (e.g., VMM security policies database 376) or other module separate from the cloud manager to determine whether a security policy applies to the guest VM. The security policy could include a requirement to apply one or more security controls to certain network traffic of the guest VM. Security controls could be in the form of virtual security appliances implementing various types of security, such as IPS, FW, DLP, etc.

If security controls are specified, then at 1506, policy manager 370 sends a query to identify existing VSAs in the virtual server in which the guest VM is to be added or moved. If it is determined at 1508 that the policy-specified VSAs are not present in the virtual server, then at 1510, policy manager 370 blocks the guest virtual machine from running.

In some embodiments, at 1512, policy manager 370 may send a request to distribution manager 380 to configure an appropriate intercept mechanism on the virtual server. For example, a hardware intercept configuration may need certain vNICs and vSwitches to be rewired. In other embodiments, an intercept mechanism may be setup and configured separately. For example, an OpenFlow switch implementation could be configured with a hardware intercept mechanism, but would not necessarily have to include it.

At 1514, it is determined whether the policy-specified VSAs are created and the intercept mechanism is configured on the virtual server. In an embodiment, a ready signal from distribution manager 380 indicates the VSAs are created and the intercept mechanism is configured. If the VSAs are created and the intercept mechanism is configured, or if it was previously determined at 1508 that the required VSAs were already present in the virtual server, then at 1516, the policy manager can update security policies on the distribution manager. The policies can indicate which network traffic flows of the guest VMs should be routed to which VSAs.

Once the security policies have been updated on the distribution manager, at 1518, the policy manager can allow the newly deployed or new guest VM to fun on the virtual machine.

Another example of a change that could be detected includes the removal or deletion of a guest VM from a virtual server. In this case, some variations may occur in flow 1500. Initially, the policy manager may determine whether security controls, previously used by the deleted guest VM, are still needed for other guest VMs on the virtual server. If these security controls (e.g. one or more VSAs) are still in use by other guest VMs, then they may remain on the virtual server.

However, if any existing VSAs are not needed on the virtual server, then those VSAs may be removed or otherwise de-provisioned on the virtual server. Additionally, if a hardware intercept mechanism (e.g., SR-IOV) had been configured for the deleted guest VM, then the hardware intercept configuration may be reconfigured such that vSwitches and vNICs are re-connected in the same manner as they were connected prior to the hardware intercept configuration for the deleted guest VM on the virtual server.

Figure 16:
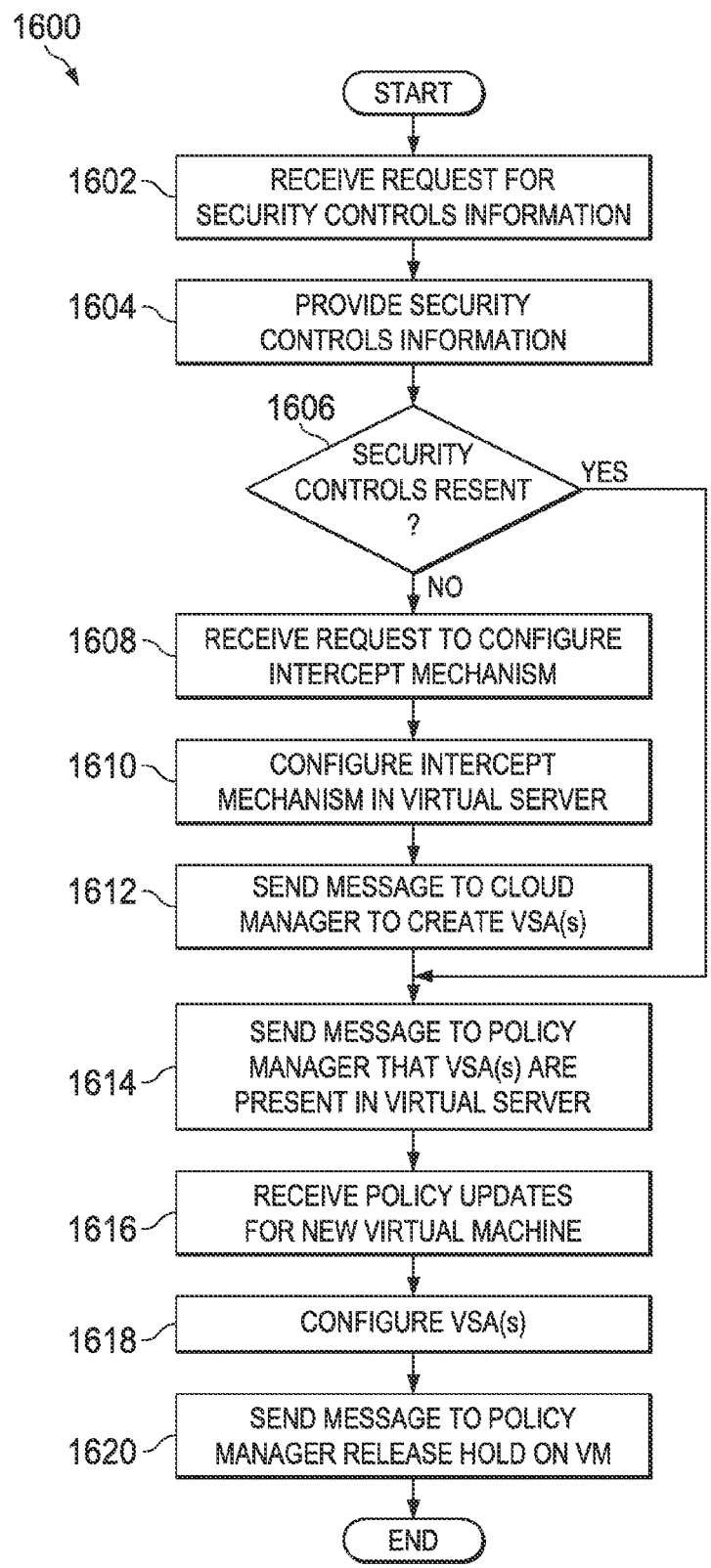
FIG. 16 is a simplified flowchart illustrating a process of a distribution manager in accordance with an embodiment of the system.

FIG. 16 is a simplified flowchart illustrating an embodiment of a process of a distribution manager. For ease of reference, distribution manager 380 and other components of FIG. 3 may be referenced in the explanation of FIG. 16, although flow 1600 may be applicable to various embodiments of the distribution manager and virtual security system described herein. In an embodiment, one or more activities of flow 1600 may be performed by provisioning module 384 in distribution manager 380.

At 1602, distribution manager 380 of virtual server 300 receives a request for security controls information. In an embodiment, the request may be from policy manager 370 to determine which, if any, virtual security appliances (VSAs) are already configured on virtual sever 30. This request may result from the policy manager determining that a guest VM is being added to virtual server 300 by cloud manager 150. In one scenario, the guest VM could be added to virtual server 300 if a new guest VM is requested by an authorized user via cloud manager 150. In another scenario, a guest VM could be added to virtual server 300 if the guest VM is being moved from another virtual server to virtual server 300.

Policy manager 370 may also provide information to distribution manager 380 identifying which VSAs, if any, are specified in a policy for the guest VM being added to virtual server 300. At 1604, distribution manager 380 can provide the security controls information to policy manager 370. The information may identify particular VSAs configured on virtual server 300, if any.

If no security controls are present as determined at 1606, then at 1608, distribution manager 380 may receive a request to configure an intercept mechanism in virtual server 300, for some embodiments of intercept mechanisms. At 1610, distribution manager 380 may configure an intercept mechanism in virtual server 300. At 1612, distribution manager 380 may also send a request to cloud manager 150 to create the VSAs that are specified in the policy for the guest VM.

At 1614, distribution manager 380 can send a message to policy manager 370 to indicate that the required VSAs are created in virtual server 300. This message can be sent after the required VSAs have been created in virtual server 300, or if it was determined at 1606 that the policy-specified VSAs are already present in virtual server 300.

At 1616, distribution manager 380 may receive policy updates from policy manager 370 for the guest VM that is being added to virtual server 300. The policy updates can be stored in VM security policies database 382 and can include rules about particular VSAs to apply to particular flows, and the order in which the VSAs are to be applied to those flows.

Figure 17A:
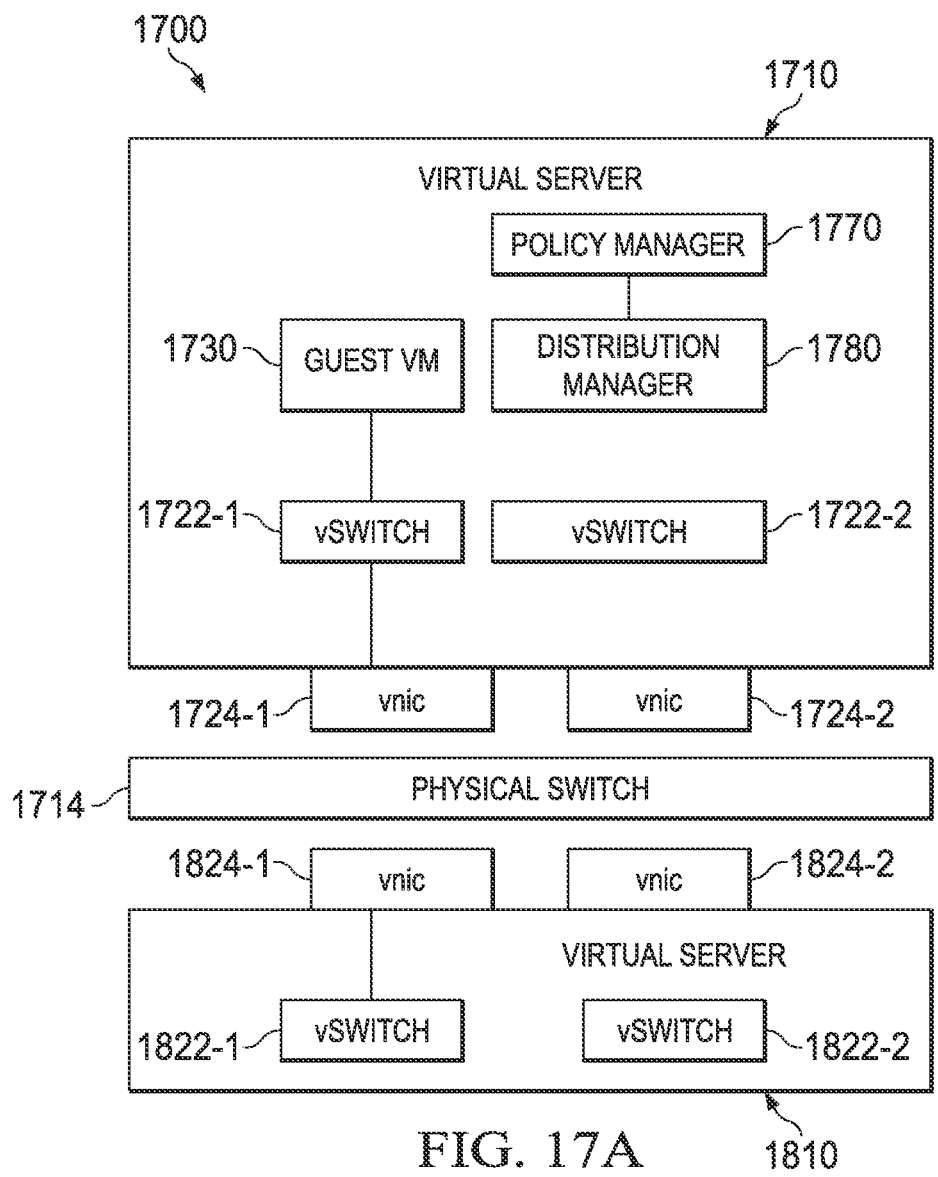
FIGS. 17A-17C are block diagrams illustrating example operations of a process of an embodiment of the system providing a virtual security appliance architecture in a virtual cloud infrastructure.
Figure 17B:
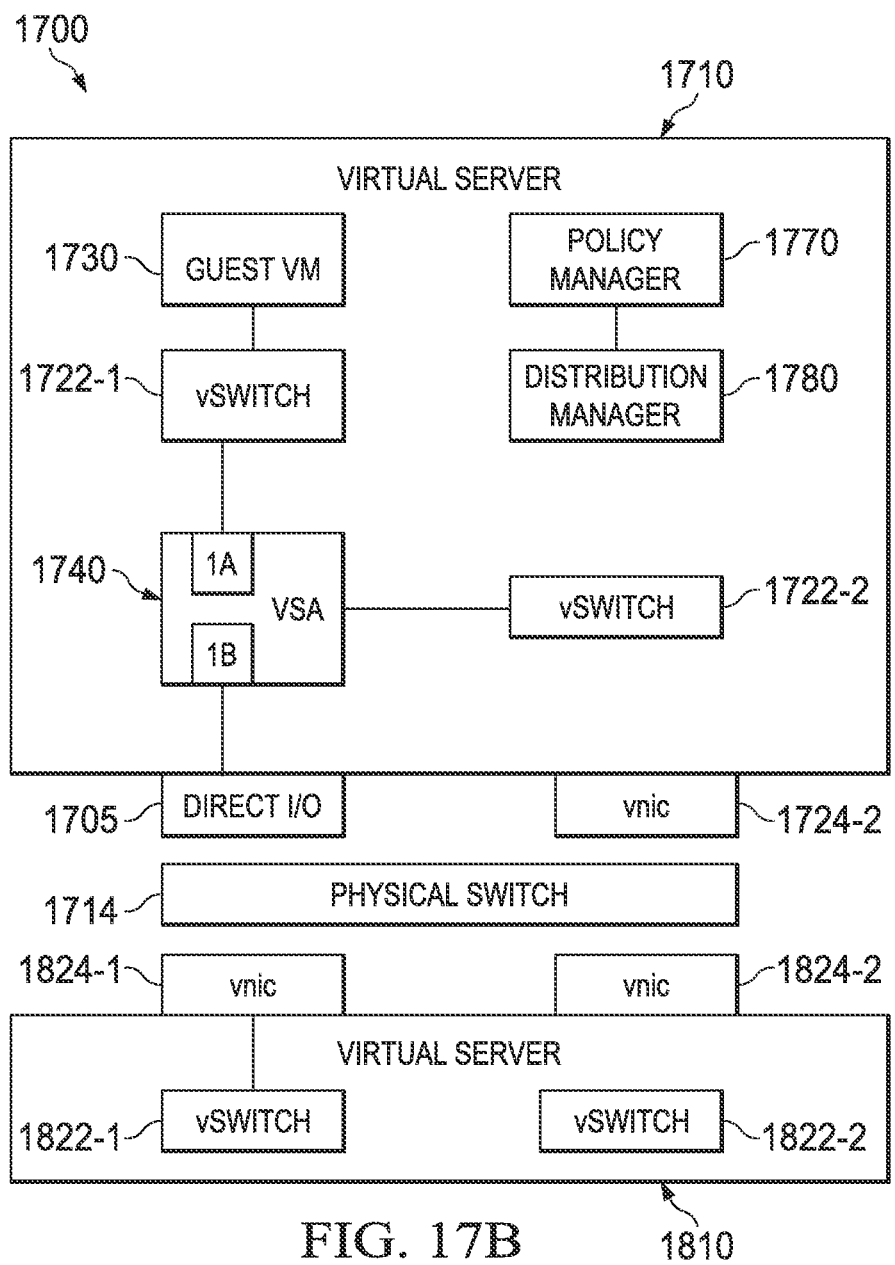
Figure 17C:
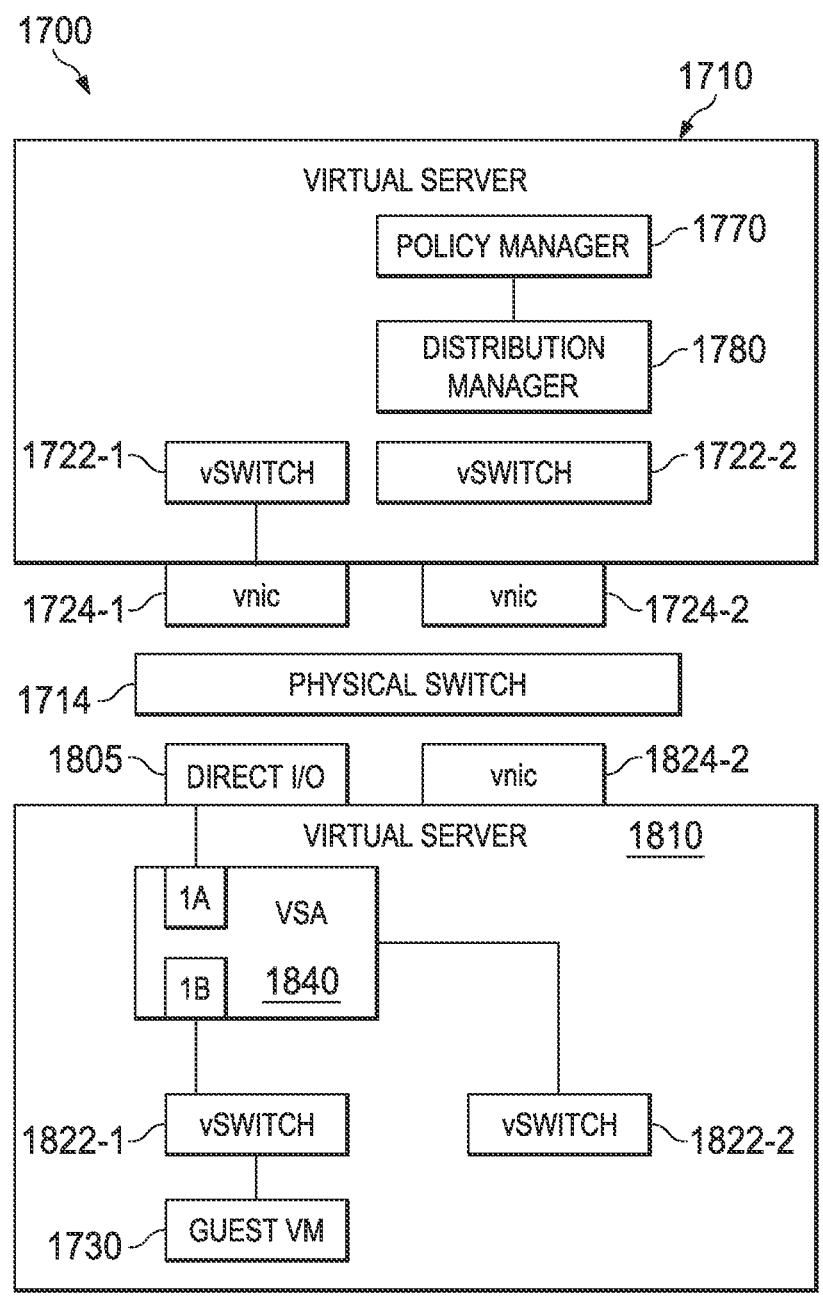

Turning to FIGS. 17A-17C, FIGS. 17A-17C are block diagrams visually illustrating sequential operations of a virtual security system when a guest virtual machine (VM) is moved within a virtual cloud infrastructure 1700 and a hardware intercept mechanism, such as SR-IOV, is used to intercept network traffic. Virtual cloud infrastructure 1700 includes two virtual servers 1710 and 1810, which can communicate via a physical switch 1714, through one or more respective virtual network interface cards (vNICs) 1724 and 1824. Each virtual server 1710 and 1810 may also be configured with one or more respective vSwitches 1722 and 1822.

Virtual server 1710 also includes a policy manager 1770 and a distribution manager 1780. Policy manager 1770 and distribution manager 1810 may be configured as described with reference to policy manager 370 and distribution manager 380 of FIG. 3.

With reference to FIG. 17A, a guest virtual machine (VM) is created in virtual server 1710. It may communicate to other guest VMs within virtual server 1710 via vSwitch 1722-1. It may also communicate to guest VMs on other servers, such as virtual server 1810. Network communications from guest VM 1730 can be sent to virtual server 1810 via vSwitch 1722-1, vNIC 1724-1, physical switch 1714, vNIC 1824-1 and vSwitch 1822-1. In the example of FIGS. 17A-17C, virtual server 1710 includes a second vSwitch 1722-2 and a second vNIC 1724-2, and virtual server 1810 includes a second vSwitch 1822-2 and a second vNIC 1824-2, for example, as shown and described with reference to FIGS. 3-4. In FIG. 17A, no security controls are activated for guest VM 1730. More specifically, security policies have not been created and/or implemented for guest VM 1730.

FIG. 17B illustrates the result of creating a new security policy for guest VM 1730. In one example, an authorized user could add a security policy to guest VM 1730 by updating a VMM security policies database of policy manager 1770. Any suitable user interface may be configured to add security policies to policy manager 1770. In one example, a security manager (e.g., security manager 175 of FIG. 1) may provide an interface to enable security policy updates to VMM security policies database of policy manager 1770.

The security policy may require that certain network traffic flows from guest VM 1730 flow through a specified VSA (e.g., IPS, FW, DLP, etc.). For simplicity and ease of illustration, only one virtual security appliance (VSA) is required by the security policy in this example. However, it will be apparent that multiple VSAs could be specified by the security policy in accordance with the present disclosure.

With reference to FIG. 17B, once the security policy is added to policy manager 1770, a VSA 1740 may be allocated in virtual server 1710. In an embodiment, policy manager 1770 may communicate with distribution manager 1780 and a cloud manager, as previously described herein, to facilitate the instantiation of VSA 1740 in virtual server 1710. For example, distribution manager 1780 may communicate a request the cloud manager to create the VSA on virtual server 1710.

Direct I/O 1705 represents a hardware intercept mechanism (e.g., SR-IOV) for network traffic from guest VM 1730. The vSwitch 1722-1 is unwired from vNIC 1724-1 to force network traffic from guest VM 1730 to flow through direct I/O 1705 hardware intercept and into VSA 1740. In an embodiment, distribution manager 1780 unwires vSwitch 1722-1 by reconfiguring the vNICs connected to the vSwitch. As a result, network traffic from guest VM 1730 is now covered by VSA 1740.

In an embodiment with a single VSA, as shown in FIG. 17A, the distribution manager may be embedded within the VSA. In an embodiment that allows multiple VSAs to be created on a single virtual server, the NIC hardware may permit a change to the L2 switch on the NIC to enable appropriate routing. In this embodiment, packets from a guest VM are automatically routed to a special hardware port (i.e., a queue) connected to the distribution manager. Thus, the NIC is modified to allow SR-IOV functions feeding into the NIC.

Turning to FIG. 17C, FIG. 17C illustrates the result of moving guest VM 1730 to virtual server 1810. Policy manager 1770 may detect the move through an application programming interface (API) to a cloud manager. A new VSA 1840 may be created in virtual server 1810. Again, in an embodiment, policy manager 1770, distribution manager 1780, and the cloud manager may communicate to create VSA 1840 on virtual server 1810. The vSwitch 1822-1 may be unwired from vNIC 1824-1 by reconfiguring the vSwitch logic in order to force network traffic from guest VM 1730 to flow through direct I/O 1805 and VSA 1840. Then, the old VSA 1740 in virtual server 1710 may be removed and vSwitch 1722-1 rewired to vNIC 1724-1. In an embodiment as shown in FIG. 17C, where the guest VM is moved to a second virtual server, a distribution manager in the second virtual server may handle the activities related to creating and configuring the new VSA and reconfiguring the vSwitch software on the second virtual server.

For simplicity and ease of illustration, only one virtual security appliance (VSA) is required by policy in this example. However, it will be apparent that multiple VSAs could be configured and in virtual servers 1710 and 1810 in accordance with the present disclosure. In these instances, distribution manager could implement a source routing mechanism as previously described herein, to route network packets from guest VM 1730 or 1830 to the appropriate VSAs (e.g., as specified by policy) in the appropriate order.

Figure 18:
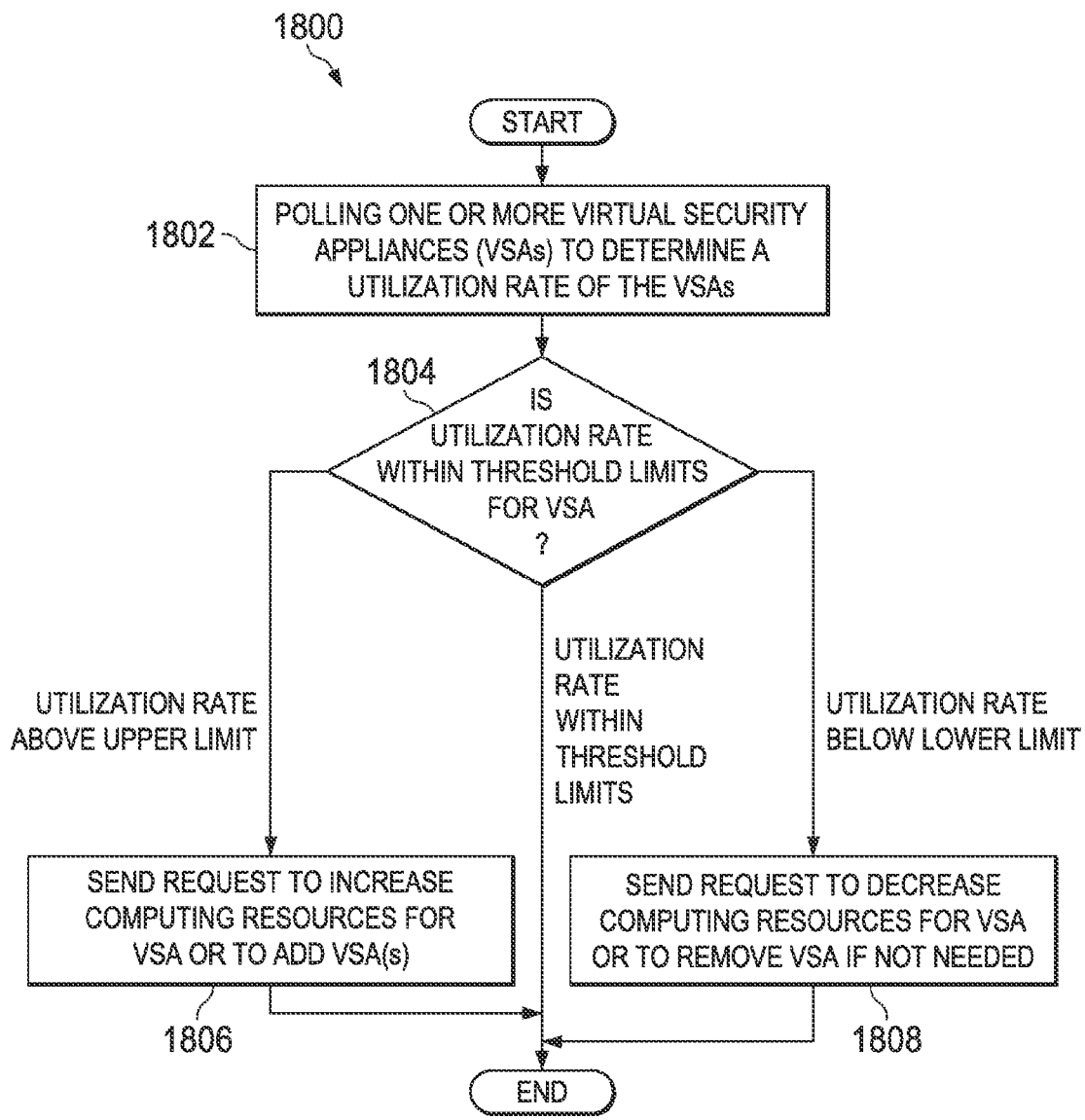
FIG. 18 is a simplified flowchart illustrating a process of a distribution manager in accordance with an embodiment of the system.

FIG. 18 is a simplified flowchart illustrating an embodiment of a process of a distribution manager. For ease of reference, distribution manager 380 and other components of FIG. 3 may be referenced in the explanation of FIG. 18, although flow 1800 may be applicable to various embodiments of the distribution manager and virtual security system described herein. In an embodiment, one or more activities of flow 1800 may be performed by provisioning module 384 in distribution manager 380.

At 1802, distribution manager 380 of virtual server 300 polls one or more virtual security appliances (VSAs) to determine a utilization rate of one or more VSAs on the virtual server. At 1804, a determination is made as to whether the utilization rate for a VSA is within predefined threshold limits for the VSA. If the utilization rate is above an upper limit of the predefined threshold limits, then at 1806, distribution manager 380 may send a request to cloud manager 150 to increase computing resources (e.g., processing, memory, storage) for the VSA or to add additional VSAs to the virtual server.

If the VSA's utilization rate is below a lower limit of the predefined threshold limits, then at 1808, distribution manager 380 may send a request to cloud manager 150 to decrease computing resources for the VSA or to remove the VSA from the virtual server if the VSA is no longer needed. For example, distribution manager 380 may evaluate the security policies for some or all of the virtual machines on the virtual server. If none of the security policies requires network traffic associated with any of the existing virtual machines to be processed by the VSA, then the VSA may be removed from the virtual server. Otherwise, the VSA may either remain on the virtual server or, if another VSA of the same type exists on the virtual server and can handle the additional load, then network traffic that is required to be processed by the under-utilized VSA may be rerouted to the other VSA.

If the utilization rate of the VSA is within the predefined threshold limits, then the process 1800 may end until distribution manager 380 polls the VSAs again. Additionally, the evaluations and actions at 1804, 1804 and 1808, and further described herein, may be performed for each of the VSAs polled by the distribution manager.

Note that in certain example implementations, the virtual security functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., FPGA, EPROM, EEPROM) or an ASIC that includes digital logic, software, code, electronic instructions, or any suitable combination thereof.

Program code, or instructions, may be stored in, for example, volatile and/or non-volatile memory, such as storage devices and/or an associated machine readable or machine accessible medium including, but not limited to, solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format.

In one example implementation, the virtual security system may include software in order to achieve the virtual security activities outlined herein. The virtual security system can include memory elements for storing information to be used in achieving the virtual security activities, as discussed herein. Additionally, the virtual security system may include a processor that can execute software or an algorithm to perform the virtual security activities, as disclosed in this Specification. These devices may further keep information in any suitable memory element (RAM, ROM, EPROM, EEPROM, ASIC, etc.), software, hardware, or in any other suitable component, device, element, or object where appropriate and based on particular needs. Any of the memory items discussed herein (e.g., databases, tables, trees, caches, etc.) should be construed as being encompassed within the broad term "memory element." Similarly, any of the potential processing elements, modules, and machines described in this Specification should be construed as being encompassed within the broad term "processor."

Note that with the example provided above, as well as numerous other examples provided herein, interaction might be described in terms of two, three, or four elements. However, this has been done for purposes of clarity and example only. In certain cases, it may be easier to describe one or more of the functionalities of a given set of flows by only referencing a limited number of elements. It should be appreciated that the virtual security system (and its teachings) is readily scalable and can accommodate a large number of components, as well as more complicated/sophisticated arrangements and configurations. Accordingly, the examples provided should not limit the scope or inhibit the broad teachings of the virtual security system as potentially applied to a myriad of other architectures.

Additionally, the operations in the preceding flow diagrams illustrate only some of the possible scenarios and patterns that may be executed by, or within, a virtual security system. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. A virtual security system provides substantial flexibility in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. While the present disclosure has described a limited number of embodiments, those skilled in the art will appreciate numerous modifications and variations therefrom. The appended claims are intended to cover all such modifications and variations as fall within the true spirit and scope of the present disclosure.

The following examples pertain to embodiments in accordance with this Specification. One or more embodiments may provide a method comprising: detecting a change for a virtual machine in a virtual server of a virtual network infrastructure, determining whether a virtual security appliance is configured in the virtual server, sending a request to create the virtual security appliance in the virtual server, allowing the virtual machine to initiate when the virtual security appliance is created in the virtual machine, wherein the virtual security appliance performs security inspections on network packets sent from the virtual machine.

An example of an embodiment further comprises creating an intercept mechanism in the virtual server to intercept the network packets from the virtual machine.

An example of an embodiment further comprises, wherein the creating the intercept mechanism includes reconfiguring logic of a virtual switch connected to the virtual machine to force the network packets from the virtual machine to a physical network interface card, and reconfiguring logic of a virtual network interface card (vNIC) to prevent the network packets from passing through the vNIC.

An example of an embodiment further comprises, wherein the intercept mechanism includes a hardware interception of network packets based on Single Root Input/Output Virtualization (SR-IOV) specification.

An example of an embodiment further comprises, wherein the change includes moving the virtual machine to the virtual server from a second virtual server, the method further comprising: deleting a second virtual security appliance from the second virtual server, and reconfiguring logic of a virtual switch in the second virtual server to communicate via a virtual network interface card, wherein the second virtual security appliance was configured to process network packets intercepted from the virtual machine when the virtual machine was running in the second virtual server.

An example of an embodiment further comprises, wherein one or more security policies identify one or more virtual security appliances to process the network packets from the virtual machine.

An example of an embodiment further comprises, wherein the one or more security policies identify an order for the one or more virtual security appliances to process the network packets from the virtual machine.

An example of an embodiment further comprises: querying the virtual security appliance on the virtual server to determine a utilization rate of the virtual security appliance; and receiving a response to the query.

An example of an embodiment further comprises sending a request to create a second virtual security appliance in the virtual server when the response indicates that more capacity is needed by the virtual security appliance.

An example of an embodiment further comprises: preventing the network packets from being sent to the virtual security appliance; and deleting the virtual security appliance when the virtual security appliance is idle, wherein the response indicates that the virtual security appliance is under-utilized.

An example of an embodiment further comprises: sending a request to allocate at least one of more processing resources and more memory to the virtual security appliance, wherein the response indicates the virtual security appliance is over-utilized. As used herein, the phrase "at least one of" may mean any one of or a combination of the list. For example, at least one of A, B, and C could mean A, B, or C, or any combination thereof.

An example of an embodiment further comprises, wherein the change detected for the virtual machine includes one of adding the virtual machine to the virtual server or moving the virtual machine to the virtual server from another virtual server.

An example of an embodiment further comprises, wherein the change is detected through an application programming interface (API) when the virtual machine is added to the virtual server or when the virtual machine is moved to a different server.

An example of an embodiment further comprises, wherein the change detected for the virtual machine includes one of requesting a new security policy for the virtual machine, or updating a security policy of the virtual machine.

An example of an embodiment further comprises: blocking the virtual machine if the virtual security appliance is not configured in the virtual server.

An example of an embodiment further comprises, wherein the virtual security appliance performs security inspections on network packets sent to the virtual machine.

An example of an embodiment further comprises, wherein a first outgoing network packet of a packet flow from the virtual machine is intercepted by an OpenFlow switch in the virtual server after the virtual machine is allowed to initiate in the virtual server, the method further comprising: generating a flow route for the outgoing network packet based on a security policy, wherein the OpenFlow switch routes the outgoing network packet according to the flow route.

One or more embodiments may provide an apparatus, comprising: a policy manager virtual machine executing on a processor, the policy manager virtual machine configured to: detect a change for a guest virtual machine in a virtual server of a virtual network infrastructure; determine whether a virtual security appliance is configured in the virtual server; and allow the virtual machine to initiate when the virtual security appliance is created in the virtual machine, wherein the virtual security appliance performs security inspections on network packets sent from the virtual machine.

An example of an embodiment further comprises a distribution manager virtual machine executing on a processor, the distribution manager virtual machine configured to send a request to create the virtual security appliance in the virtual server.

An example of an embodiment further comprises, wherein the distribution manager is further configured to create an intercept mechanism in the virtual server to intercept the network packets from the virtual machine.

An example of an embodiment further comprises, wherein the create the intercept mechanism includes: reconfiguring logic of a virtual switch connected to the virtual machine to force the network packets from the virtual machine to a physical network interface card; and reconfiguring logic of a virtual network interface card (vNIC) to prevent the network packets from passing through the vNIC.

One or more embodiments may provide an at least one machine accessible storage medium having instructions stored thereon, the instructions when executed on a machine, cause the machine to: detect a change for a guest virtual machine in a virtual server of a virtual network infrastructure; determine whether a virtual security appliance is configured in the virtual server; and send a request to create the virtual security appliance in the virtual server; and allow the virtual machine to initiate when the virtual security appliance is created in the virtual machine, wherein the virtual security appliance performs security inspections on network packets sent from the virtual machine.

An example of an embodiment further comprises, wherein the change includes moving the virtual machine to the virtual server from a second virtual server, the method further comprising: deleting a second virtual security appliance from the second virtual server; and reconfiguring logic of a virtual switch in the second virtual server to communicate via a virtual network interface card, wherein the second virtual security appliance was configured to process network packets intercepted from the virtual machine when the virtual machine was running in the second virtual server.

An example of an embodiment further comprises, wherein one or more security policies identify one or more virtual security appliances to process the network packets from the virtual machine.

One or more embodiments may provide a method, comprising: polling a virtual security appliance in a virtual server of a virtual network infrastructure to determine a utilization rate of the virtual security appliance; sending a request to a cloud manager to increase computing resources for the virtual security appliance if the utilization rate is above an upper threshold amount; and sending a request to the cloud manager to decrease computing resources for the virtual security appliance if the utilization rate is below a lower threshold amount, wherein network packets associated with one or more virtual machines in the virtual server are routed to the virtual security appliance.

An example of an embodiment further comprises, wherein the network packets are intercepted prior to being routed to the virtual security appliance.

One or more embodiments may provide a method, comprising: polling a virtual security appliance in a virtual server of a virtual network infrastructure to determine a utilization rate of the virtual security appliance; sending a request to a cloud manager to create another virtual security appliance in the virtual server if the utilization rate is above an upper threshold amount; and wherein network packets associated with one or more virtual machines in the virtual server are routed to the virtual security appliance.

An example of an embodiment further comprises, wherein the network packets are intercepted prior to being routed to the virtual security appliance.

One or more embodiments may provide a method, comprising: polling a virtual security appliance in a virtual server of a virtual network infrastructure to determine a utilization rate of the virtual security appliance; preventing new network packets from being routed to the virtual security appliance if it is determined that no security policy requires a virtual machine of the virtual server to be processed by the virtual security appliance; and sending a request to a cloud manager to remove the virtual security appliance in the virtual server when the virtual security appliance is idle, wherein previously sent network packets associated with one or more virtual machines in the virtual server were routed to the virtual security appliance.

An example of an embodiment further comprises, wherein the previously sent network packets were intercepted prior to being routed to the virtual security appliance.

What is claimed is:

1. A method for providing a virtual security appliance (VSA) architecture in a virtual network infrastructure, the method comprising:
   detecting a change for a guest virtual machine (VM) in the virtual network infrastructure, wherein the change comprises moving the guest VM from a first virtual server to a second virtual server of the virtual network infrastructure;
   determining a policy of one or more security policies requires a security control for the guest VM;
   determining whether there is an already present VSA configured as a VM capable of applying the required security control to the guest VM running in the second virtual server, wherein the applying comprises performing security inspections on network packets of a packet stream associated with the guest VM;
   upon determining there is not the already present VSA running in the second virtual server, performing a process comprising:
      initiating the guest VM in the second virtual server and sending a request to create a new VSA capable of applying the required security control in the second virtual server, wherein the initiating comprises running the quest VM in the second virtual server and routing the packet stream associated with the quest VM through an existing VSA capable of applying the required security control running on another virtual server of the virtual network infrastructure;
      creating the new VSA on the second virtual server and running the new VSA, wherein the creating is based at least in part on the request and is performed at least partially concurrently with the running of the quest VM; and
      routing, when the new VSA is running on the second server, the packet stream through the new VSA instead of the existing VSA; and
   upon determining there is the already present VSA running in the second virtual server, running the guest VM in the second virtual server and routing the packet stream associated with the guest VM through the already present VSA.

2. The method of claim 1, wherein the routing of the packet stream is performed, at least in part, via an intercept mechanism created in the second virtual server to intercept the network packets from the guest VM.

3. The method of claim 2, wherein the creating the intercept mechanism includes:
   reconfiguring logic of a virtual switch connected to the guest VM to force the network packets from the guest VM to a physical network interface card; and
   reconfiguring logic of a virtual network interface card (vNIC) to prevent the network packets from passing through the vNIC.

4. The method of claim 1, wherein the one or more security policies further identify one or more additional VSAs to process the network packets from the guest VM.

5. The method of claim 4, wherein the one or more security policies identify an order for the one or more additional VSAs to process the network packets from the guest VM.

6. An apparatus for providing a virtual security appliance (VSA) architecture in a virtual network infrastructure, the apparatus comprising:
   at least one processor; and
   at least one computer-readable storage medium comprising instructions stored thereon, the instructions when executed by the at least one processor, cause the apparatus to:
      detect a change for a guest virtual machine (VM) in the virtual network infrastructure, wherein the change comprises moving the guest VM from a first virtual server to a second virtual server of the virtual network infrastructure;
      determine a policy of one or more security policies requires a security control for the guest VM;
      determine whether there is an already present VSA configured as a VM capable of applying the required security control to the guest VM running in the second virtual server, wherein the applying comprises performing security inspections on network packets of a packet stream associated with the guest VM;
      upon determining there is not the already present VSA running in the second virtual server, further causing the apparatus to:

initiate the guest VM in the second virtual server and send a request to create a new VSA capable of applying the required security control in the second virtual server, wherein the initiating comprises running the quest VM in the second virtual server and routing the packet stream associated with the quest VM through an existing VSA capable of applying the required security control running on another virtual server of the virtual network infrastructure;

create the new VSA on the second virtual server and run the new VSA, wherein the creating is based at least in part on the request and is performed at least partially concurrently with the running of the quest VM; and route, when the new VSA is running on the second server, the packet stream through the new VSA instead of the existing VSA; and upon determining there is the already present VSA running in the second virtual server, run the guest VM in the second virtual server and route the packet stream associated with the guest VM through the already present VSA.

7. The apparatus of claim 6, wherein the routing of the packet stream is performed, at least in part, via an intercept mechanism created in the second virtual server to intercept the network packets from the guest VM.

8. The apparatus of claim 7, wherein the creating the intercept mechanism includes:
   reconfiguring logic of a virtual switch connected to the guest VM to force the network packets from the guest VM to a physical network interface card; and
   reconfiguring logic of a virtual network interface card (vNIC) to prevent the network packets from passing through the vNIC.

9. The apparatus of claim 6, wherein the one or more security policies further identify one or more additional VSAs to process the network packets from the guest VM.

10. The apparatus of claim 9, wherein the one or more security policies identify an order for the one or more additional VSAs to process the network packets from the guest VM.

11. At least one non-transitory machine readable storage medium comprising instructions stored thereon for providing a virtual security appliance (VSA) architecture in a virtual network infrastructure, the instructions when executed on a machine, cause the machine to:
   detect a change for a guest virtual machine (VM) in the virtual network infrastructure, wherein the change comprises moving the quest VM from a first virtual server to a second virtual server of the virtual network infrastructure;
   determine a policy of one or more security policies requires a security control for the guest VM;
   determine whether there is an already present VSA configured as a VM capable of applying the required security control to the guest VM running in the second virtual server, wherein the applying comprises performing security inspections on network packets of a packet stream associated with the quest VM;
   upon determining there is not the already present VSA running in the second virtual server, further causing the machine to:
      initiate the quest VM in the second virtual server and send a request to create a new VSA capable of applying the required security control in the second virtual server, wherein the initiating comprises running the quest VM in the second virtual server and routing the packet stream associated with the quest VM through an existing VSA capable of applying the required security control running on another virtual server of the virtual network infrastructure;
      create the new VSA on the second virtual server and run the new VSA, wherein the creating is based at least in part on the request and is performed at least partially concurrently with the running of the quest VM; and
      route, when the new VSA is running on the second server, the packet stream through the new VSA instead of the existing VSA; and
   upon determining there is the already present VSA running in the second virtual server, run the quest VM in the second virtual server and route the packet stream associated with the quest VM through the already present VSA.

12. The at least one non-transitory machine readable storage medium of claim 11, wherein the instructions, when executed on the machine, further cause the machine to:
   delete the existing VSA from the first virtual server based, at least in part, on the existing VSA running in the first virtual server and the packet stream being routed through the new VSA instead of the existing VSA; and
   reconfigure logic of a virtual switch in the first virtual server to communicate via a virtual network interface card, wherein the existing VSA applied the required security control to the quest VM at the first virtual server prior to moving the quest VM to the second virtual server.

13. The at least one non-transitory machine readable storage medium of claim 11, wherein the one or more security policies further identify one or more additional VSAs to process the network packets from the guest VM.

14. The at least one non-transitory machine readable storage medium of claim 13, wherein the one or more security policies identify an order for the one or more additional VSAs to process the network packets from the guest VM.

15. The at least one non-transitory machine readable storage medium of claim 11, wherein the routing of the packet stream is performed, at least in part, via an intercept mechanism created in the second virtual server to intercept the network packets from the guest VM.

16. The at least one non-transitory machine readable storage medium of claim 15, wherein the creating the intercept mechanism includes executing instructions which cause the machine to:
   reconfigure logic of a virtual switch connected to the guest VM to force the network packets from the guest VM to a physical network interface card; and
   reconfigure logic of a virtual network interface card (vNIC) to prevent the network packets from passing through the vNIC.

17. The at least one non-transitory machine readable storage medium of claim 15, wherein the intercept mechanism is based on Single Root Input/Output Virtualization (SR-IOV) specification.

18. The at least one non-transitory machine readable storage medium of claim 11, wherein the instructions, when executed on the machine, further cause the machine to:
   query the new VSA running on the second virtual server to determine a utilization rate of the new VSA; and
   receive a response to the query.

19. The at least one non-transitory machine readable storage medium of claim 18, wherein the instructions, when executed on the machine, further cause the machine to:
send a request to create a second VSA in the second virtual server if the response indicates that the new VSA is over-utilized.

20. The at least one non-transitory machine readable storage medium of claim 18, wherein the instructions, when executed on the machine, further cause the machine to:
prevent any further network packets from being sent to the new VSA and delete the new VSA if the response indicates that the new VSA is under-utilized and there is at least one additional VSA on the second virtual server that is a duplicate of the new VSA.

21. The at least one non-transitory machine readable storage medium of claim 18, wherein the instructions, when executed on the machine, further cause the machine to:
send a request to allocate more resources to the new VSA if the response indicates the new VSA is over-utilized, wherein the resources comprise one or more of processor and memory resources.

22. The at least one non-transitory machine readable storage medium of claim 11, wherein the change is detected through an application programming interface (API) of a cloud manager.

23. The at least one non-transitory machine readable storage medium of claim 11, wherein a first outgoing network packet of a packet flow from the guest VM is intercepted by an OpenFlow switch in the second virtual server after the guest VM is initiated in the second virtual server, wherein the instructions, when executed on the machine, further cause the machine to:
generate a flow route for the outgoing network packet based on one of the security policies, wherein the OpenFlow switch routes the outgoing network packet according to the flow route.

* * * * *

UNITED STATES PATENT AND TRADEMARK OFFICE
CERTIFICATE OF CORRECTION

PATENT NO. : 9,571,507 B2
APPLICATION NO. : 13/656730
DATED : February 14, 2017
INVENTOR(S) : Geoffrey Howard Cooper et al.

It is certified that error appears in the above-identified patent and that said Letters Patent is hereby corrected as shown below:

In the Claims

In Column 34, Line 5, in Claim 1, delete "quest" and insert -- guest --, therefor.

In Column 34, Line 6, in Claim 1, delete "quest" and insert -- guest --, therefor.

In Column 34, Line 14, in Claim 1, delete "quest" and insert -- guest --, therefor.

In Column 35, Line 5, in Claim 6, delete "quest" and insert -- guest --, therefor.

In Column 35, Line 7, in Claim 6, delete "quest" and insert -- guest --, therefor.

In Column 35, Line 15, in Claim 6, delete "quest" and insert -- guest --, therefor.

In Column 35, Line 50, in Claim 11, delete "quest" and insert -- guest --, therefor.

In Column 35, Line 60, in Claim 11, delete "quest" and insert -- guest --, therefor.

In Column 35, Line 64, in Claim 11, delete "quest" and insert -- guest --, therefor.

In Column 36, Line 1, in Claim 11, delete "quest" and insert -- guest --, therefor.

In Column 36, Line 2, in Claim 11, delete "quest" and insert -- guest --, therefor.

In Column 36, Line 9, in Claim 11, delete "quest" and insert -- guest --, therefor.

In Column 36, Line 15, in Claim 11, delete "quest" and insert -- guest --, therefor.

In Column 36, Line 17, in Claim 11, delete "quest" and insert -- guest --, therefor.

Signed and Sealed this
Second Day of May, 2017

Michelle K. Lee
*Director of the United States Patent and Trademark Office*

CERTIFICATE OF CORRECTION (continued)
U.S. Pat. No. 9,571,507 B2

In Column 36, in Line 11 of Claim 12, delete "quest" and insert -- guest --, therefor.

In Column 36, in Line 12 of Claim 12, delete "quest" and insert -- guest --, therefor.